United States Patent
Nezaki et al.

(10) Patent No.: US 11,198,414 B2
(45) Date of Patent: Dec. 14, 2021

(54) OCCUPANT RESTRAINT SYSTEM FOR VEHICLE

(71) Applicant: Toyota Jidosha Kabushiki Kaisha, Toyota (JP)

(72) Inventors: Takuya Nezaki, Mizunami (JP); Motoki Sugiyama, Kasugai (JP); Fumihito Komeno, Nagoya (JP); Makoto Matsuzaki, Aichi-ken (JP); Kenji Fukuta, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 16/598,395

(22) Filed: Oct. 10, 2019

(65) Prior Publication Data
US 2020/0114866 A1 Apr. 16, 2020

(30) Foreign Application Priority Data

Oct. 12, 2018 (JP) .............................. JP2018-193785
Sep. 27, 2019 (JP) .............................. JP2019-177238

(51) Int. Cl.
*B60R 22/46* (2006.01)
*B60R 21/0132* (2006.01)
*B60R 22/26* (2006.01)

(52) U.S. Cl.
CPC .......... *B60R 22/46* (2013.01); *B60R 21/0132* (2013.01); *B60R 22/26* (2013.01);
(Continued)

(58) Field of Classification Search
CPC . B60R 22/46; B60R 22/26; B60R 2022/4666; B60R 2022/4685;
(Continued)

(56) References Cited

U.S. PATENT DOCUMENTS 6,394,495 B1    5/2002  Specht
6,766,875 B2 *  7/2004  Yamamoto ............ B60R 21/013
                                                180/282
(Continued)

FOREIGN PATENT DOCUMENTS

CN      1603183 A     4/2005
CN    101233019 A     7/2008
(Continued)

OTHER PUBLICATIONS

U.S. Appl. No. 16/928,582, filed Jul. 14, 2020; Inventor: Kenji Fukuta.
(Continued)

*Primary Examiner* — Ruth Ilan
*Assistant Examiner* — Caitlin Anne Miller
(74) *Attorney, Agent, or Firm* — Dinsmore & Shohl LLP

(57) ABSTRACT

An occupant restraint system for a vehicle includes: a seat belt device configured w restrain an occupant seated on a vehicular seat with a webbing, in which one end of the webbing is wound around a winding device and the other end is fixed to one of the vehicular seat and a vehicle body, and the seat belt device is configured so that a motor provided in the winding device is driven to wind the webbing; and an electronic control unit configured to drive the motor so that a prescribed amount of the webbing is wound, when a first condition is satisfied.

7 Claims, 15 Drawing Sheets

(52) U.S. Cl.
CPC ............... *B60R 2021/01327* (2013.01); *B60R 2022/4666* (2013.01)

(58) Field of Classification Search
CPC ...... B60R 21/0132; B60R 2021/01327; B60R 2021/01313
See application file for complete search history.

(56) References Cited

U.S. PATENT DOCUMENTS

| | | | |
|---|---|---|---|
| 8,090,505 B2 * | 1/2012 | Takemura | B60R 21/01546 |
| | | | 701/46 |
| 8,818,642 B2 * | 8/2014 | Bunker | B60R 21/01 |
| | | | 701/45 |
| 9,275,008 B2 * | 3/2016 | Bunker | B60R 21/0132 |
| 9,346,465 B2 * | 5/2016 | Bunker | B60W 40/12 |
| 2001/0025735 A1 | 10/2001 | Midorikawa et al. | |
| 2003/0114973 A1 * | 6/2003 | Takagi | B60R 21/0132 |
| | | | 701/45 |
| 2004/0080204 A1 * | 4/2004 | Enomoto | B60R 21/01556 |
| | | | 297/480 |
| 2005/0099065 A1 | 5/2005 | Harada et al. | |
| 2007/0228713 A1 * | 10/2007 | Takemura | B60R 22/46 |
| | | | 280/753 |
| 2008/0023246 A1 * | 1/2008 | Gillet | B60R 21/0132 |
| | | | 180/268 |
| 2008/0033616 A1 * | 2/2008 | Gillet | B60R 21/013 |
| | | | 701/45 |
| 2008/0300753 A1 | 12/2008 | Bauer et al. | |
| 2008/0319617 A1 | 12/2008 | Takemura | |
| 2009/0174174 A1 * | 7/2009 | McCoy | B60R 21/214 |
| | | | 280/749 |
| 2018/0354455 A1 | 12/2018 | Umakoshi et al. | |
| 2019/0184926 A1 | 6/2019 | Jang | |
| 2020/0130642 A1 | 4/2020 | Nezaki et al. | |

FOREIGN PATENT DOCUMENTS

| | | |
|---|---|---|
| CN | 102548831 A | 7/2012 |
| CN | 102730001 A | 10/2012 |
| EP | 0728624 A2 | 8/1996 |
| EP | 2505434 A2 | 10/2012 |
| EP | 2505435 A2 | 10/2012 |
| JP | 2004-074957 A | 3/2004 |
| JP | 2007-237915 A | 9/2007 |
| JP | 2007-276540 A | 10/2007 |
| JP | 2008-535723 A | 9/2008 |
| JP | 2013-159191 A | 8/2013 |
| WO | 2006107251 A1 | 10/2006 |
| WO | 2011055794 A1 | 5/2011 |

OTHER PUBLICATIONS

Office Action issued by European Patent Office dated Sep. 4, 2020 in EP 19201727.5.

Office Action issued to U.S. Appl. No. 16/928,582 dated Aug. 20, 2021.

* cited by examiner

OCCUPANT RESTRAINT SYSTEM FOR VEHICLE

CROSS-REFERENCE TO RELATED APPLICATIONS

This application claims priority to Japanese Patent Application No. 2018-193785 filed Oct. 12, 2018, and Japanese Patent Application No. 2019-177238 filed on Sep. 27, 2019, which are incorporated herein by reference in their entirety.

BACKGROUND

1. Technical Field

The disclosure relates to an occupant restraint system for a vehicle.

2. Description of Related Art

In Japanese Unexamined Patent Application Publication No. 2007-276540 (JP 2007-276540 A), a seat belt device in which a motor is driven so as to retract a webbing is disclosed. In JP 2007-276540 A, the motor is driven when a steering angle, a steering angular speed, and a steering angular acceleration satisfy prescribed thresholds. In Japanese Unexamined Patent Application Publication No. 2008-535723 (JP 2008-535723 A), a configuration in which a tensile force of a webbing is increased when an increase/decrease rate of a steering angle (steering angular speed) exceeds a threshold is disclosed. Japanese Unexamined Patent Application Publication No. 2013-159191 (JP 2013-159191 A) discloses a configuration in which a motor of a seat belt device is driven when a steering angle and a steering angular speed are equal to or more than prescribed thresholds while an acceleration of a vehicle is small. Japanese Unexamined Patent Application Publication No. 2007-237915 (JP 2007-237915 A) discloses a configuration including a turning control means that stabilizes a traveling state while a vehicle is turning. A motor is driven so that a webbing is wound when a prescribed period of time has passed after the turning control means is operated.

SUMMARY

However, there is a possibility that a webbing is wound even when a large lateral acceleration is not acting on a vehicle. In the viewpoint of ensuring comfortability, it is not favorable that tensile force of the webbing is increased when it is not required.

The disclosure provides an occupant restraint system for a vehicle, which is able to maintain comfortability and occupant protection performance.

An occupant restraint system for a vehicle of a aspect includes the following: a seat belt device configured to restrain an occupant seated on a vehicular seat with a webbing, in which a first end of the webbing is wound around a winding device and a second end is fixed to one of the vehicular seat and a vehicle body, and the seat belt device is configured such that a motor provided in the winding device is driven to wind the webbing; and an electronic control unit that is configured to drive the motor such that a prescribed amount of the webbing is wound, when a first condition is satisfied. The first condition is that a vehicle speed is equal to or more than a prescribed vehicle speed threshold, a steering angular speed is equal to or more than a prescribed steering angular speed threshold, and an estimated lateral acceleration that is estimated to act on the vehicle is equal to or more than a prescribed first acceleration threshold.

In the occupant restraint system for the vehicle of the first aspect, a first end of the webbing of the seat belt device is wound around the winding device and a second end is fixed to one of the vehicular seat and the vehicle body. The seat belt device is configured to restrain the occupant to the vehicular seat with the webbing. The motor is provided in the winding device. The motor is driven to wind the webbing. Thus, even when a large acceleration is generated in the vehicle, a tensile force of the webbing is able to be increased so as to suppress an inertial movement of the occupant.

The occupant restraint system for the vehicle includes the electronic control unit that drives the motor. The electronic control unit drives the motor then the first condition is satisfied. The first condition is that the vehicle speed is equal to or more than the prescribed vehicle speed threshold, the steering angular speed is equal to or more than the prescribed steering angular speed threshold, and the estimated lateral acceleration is equal to or more than the prescribed first acceleration threshold. In this way, by adding the estimated lateral acceleration to the conditions of driving the motor, it is possible to cause the webbing to be wound when it is estimated that the occupant will move inertially in a vehicle width direction.

The occupant restraint system for the vehicle of a second aspect according to the first aspect may include a steering angle sensor configured to detect a steering angle and a vehicle speed sensor that detects the vehicle speed. The steering angular speed may be calculated based on the steering angle detected by the steering angle sensor and the estimated lateral acceleration may be calculated based on the vehicle speed detected by the vehicle speed sensor and the steering angle.

In the occupant restraint system for the vehicle of the second aspect, it is possible to drive the motor of the winding device before an input of lateral acceleration is actually received by the vehicle, by calculating the steering angular speed and the estimated lateral acceleration using the steering angle and the vehicle speed, respectively.

In the occupant restraint system for the vehicle of a third aspect according to the second aspect, when a second condition is satisfied, the electronic control unit may be configured to drive the motor such that the prescribed amount of the webbing is wound. The second condition is that an absolute value of the steering angle is larger than a steering angle at which the vehicle is determined to be traveling straight, and an amount of change of the steering angle is large, with reference to a state in which the vehicle speed is equal to or more than the prescribed vehicle speed threshold and the steering angular speed is equal to or more than the prescribed steering angular speed threshold.

In the occupant restraint system for the vehicle of the third aspect, when an absolute value of the steering angle is larger than a steering angle at which the vehicle is determined to be traveling straight, that is, when the vehicle is steered to the right or left, there is a possibility that a steering angular speed and an estimated lateral acceleration, exceed the steering angular acceleration threshold and the acceleration threshold, respectively, even if only a slight amount of steering is performed. In such a case, the motor is driven when an amount of change of a steering angular speed is large, with reference to a state in which a steering angular speed is equal to or more than the steering angular speed threshold. Thus, it is possible to suppress the motor from being driven unnecessarily, even while steering is performed to the right or left.

In the occupant restraint system for the vehicle of a fourth aspect according to the second aspect, the electronic control unit may be configured to drive the motor such that a prescribed amount of the webbing is wound, when a third condition is satisfied. The third condition is that an absolute value of the steering angle is larger than a steering angle at which the vehicle is determined to be traveling straight, and the estimated lateral acceleration is equal to or more than a prescribed second acceleration threshold, the estimated lateral acceleration being calculated based on the vehicle speed and an amount of change of the steering angle after a prescribed period of time has passed, with reference to a state in which the vehicle speed is equal to or more than the prescribed vehicle speed threshold and the steering angular speed is equal to or more than the prescribed steering angular speed threshold.

In the occupant restraint system for the vehicle according to the fourth aspect, when the vehicle is being steered to the right or left, the estimated lateral acceleration is calculated based on the vehicle speed and the amount of change of the steering angle, with reference a state in which the vehicle is being steered. Here, the estimated lateral acceleration is set as the condition for driving the motor. In this way, even when an input of a slight amount of steering is received while steering is performed to the right or left, it is possible to suppress the motor from being driven.

In the occupant restraint system for the vehicle of a fifth aspect according to the fourth aspect, the electronic control unit may be configured to reduce a winding amount of the webbing such that the winding amount of the webbing when the steering angular speed is equal to or more than the prescribed steering angular speed threshold due to steering being per in one direction and then steering being performed in a reverse direction, is smaller than a winding amount of the webbing when the steering angular speed is equal to or more than the prescribed steering angular speed threshold due to steering being performed in one direction and then steering being performed in the same direction.

In the occupant restraint system for the vehicle according to the fifth aspect, the winding amount of the webbing is reduced when steering is performed in the reverse direction (returning direction) of a steering direction while steering is being performed, compared to when steering is performed in the same direction (turning direction) as the steering direction. Here, when steering is performed in the reverse direction of the steering direction while steering is being performed, the amount of inertial movement of the occupant is less than that of when steering is performed in the same direction as the steering direction. There is a possibility that when tensile force of the webbing is increased, restraining force becomes unnecessarily high. To restrict the restraining force of the occupant from becoming unnecessarily high, the winding amount of the webbing when steering is performed in the reverse direction of the steering direction while steering is being performed is reduced.

In the occupant restraint system of a sixth aspect according to the fifth aspect, the electronic control unit may be configured to set an acceleration threshold for driving the motor when steering is performed in one direction and then steering is performed in the reverse direction to be a value larger than the acceleration threshold when steering is performed in one direction and then steering is performed in the same direction.

In the occupant restraint system for the vehicle according to the sixth aspect, even when lateral accelerations of the same magnitude are acting on the vehicle, the motor is driven when steering is performed in the same direction as the steering direction, and the motor is not driven when steering is performed in the reverse direction of the steering direction. Suppose an input of lateral acceleration that is received when steering is performed in the reverse direction of the steering direction and an input of lateral acceleration that is received when steering is performed in the same direction as the steering direction have the same value. Even in such a case, the amount of inertial movement of the occupant is smaller when steering is performed in the reverse direction of the steering direction. It is thus possible to suppress the restraining force from becoming high when it is estimated that the amount of inertial movement of the occupant is small, by setting the acceleration threshold in this case to a large value.

In the occupant restraint system for the vehicle of a seventh aspect according to the preceding aspects, the electronic control unit may be configured to switch a determination element from an amount of change of the steering angle to an absolute value of the steering angle within a prescribed period of time from when the steering angle reaches a steering angle at which the vehicle is determined to be traveling straight, when steering is performed in one direction and then steering is performed in a reverse direction. The electronic control unit is configured to drive a motor to wind the webbing for a prescribed amount when the estimated lateral acceleration that is calculated based on the vehicle speed and the absolute value of the steering angle is equal to or more than a prescribed acceleration threshold.

In the occupant restraint system for the vehicle according to the seventh aspect, the electronic control unit switches a determination element from an amount of change of the steering, angle to an absolute value of the steering angle within a prescribed period of time from when the steering angle reaches a steering angle at which the vehicle is determined to be traveling straight, when steering is performed in a reverse direction (returning direction) of the steering direction while steering is being performed. That is, if the steering angular speed is set as the determination element when steering is performed in the turning direction after steering is performed in the returning direction while steering is being performed, an amount of change of a steering angle while performing steering in the returning direction is taken into consideration. Thus, there is a possibility that the estimated lateral acceleration that is calculated based on the amount of change of the steering angle reaches a prescribed acceleration threshold and the webbing is wound, at an early timing while steering is performed in the turning direction. The occupant that is moving inertially in the vehicle width direction returns to a basic position in the vehicle width direction, at an early timing while steering is performed in the turning direction, that is, at the timing of transitioning from steering in the returning direction to steering in the turning direction. If the webbing is wound at this timing, the occupant feels uncomfortable. In contrast, suppose that the absolute value of the steering angle is set as the determination element within the prescribed period of time from when the steering angle reaches a steering angle at which the vehicle is determined to be traveling straight and the webbing is wound when the estimated lateral acceleration that is calculated based on the vehicle speed and the absolute value of the steering angle is equal to or more than a prescribed value. In such a case, it is possible that the webbing is wound at a timing when steering is continuously performed in the turning direction and it is estimated that the occupant moves inertially in the vehicle width direction, rather than at an early timing while steering is performed in the turning direction, that is, rather than at a timing of transitioning from steering in the returning direction to steering in the turning direction.

In the occupant restraint system of the eighth aspect according to the preceding aspects, the electronic control unit may be configured to wind an amount of the webbing that is smaller than an amount of the webbing that is wound when the estimated lateral acceleration is equal to or more than a prescribed acceleration threshold, when skidding is predicted or detected while the vehicle is traveling.

In the occupant restraint system according to the eighth aspect, a smaller amount of webbing is wound when skidding of the vehicle is predicted or detected, compared to when the estimated lateral acceleration is equal to or more than the acceleration threshold. That is, the webbing is wound to some extent before counter steering operation is performed by the occupant when skidding of the vehicle occurs. In this way, an amount of change of tensile force of the webbing between before counter steering operation and during counter steering operation can be reduced. It is thus possible to mitigate uncomfortableness that is felt by the occupant.

As described above, with the occupant restraint system for the vehicle of the aspects of the disclosure, it is possible to maintain comfortability and occupant protection performance.

With the occupant restraint system for the vehicle of the aspects of the disclosure, it is possible to restrain the occupant before the occupant moves inertially.

With the occupant restraint system for the vehicle of the aspects of the disclosure, it is possible to improve comfortability of the occupant.

With the occupant restraint system for the vehicle of the aspects of the disclosure, it is possible to suppress the occupant from feeling uncomfortable.

With the occupant restraint system for the vehicle of the aspects of the disclosure, it is possible to restrain the occupant at an appropriate timing.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
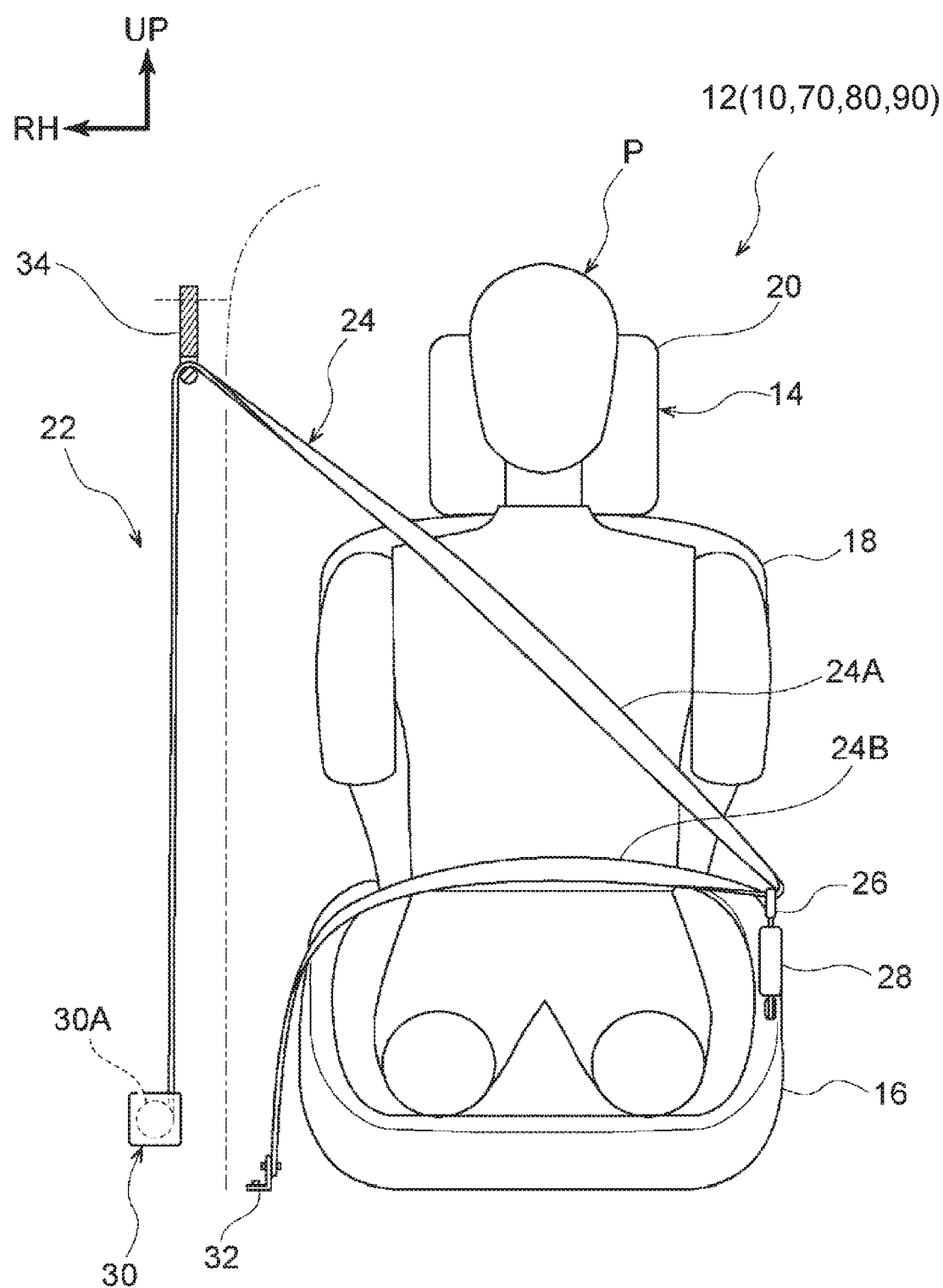
FIG. 1 is a schematic front view of a vehicular seat, in which an occupant restraint system for a vehicle according to a first embodiment is applied, as seen from a front side of a vehicle.

An occupant restraint system 10 for a vehicle according to a first embodiment will be described below with reference to FIGS. 1 to 6. An arrow FR, an arrow UP, and an arrow RH illustrated in the drawings as appropriate, indicate a forward direction of the vehicle, an upward direction of the vehicle, and a rightward direction of the vehicle, respectively. Hereinafter, when the terms front-rear direction, up-down direction, and right-left direction are simply used in the description, these directions indicate the forward and rearward in the front-rear direction of the vehicle, upward and downward in the up-down direction of the vehicle, and rightward and leftward when facing the forward direction of the vehicle, respectively, unless otherwise stated.

As illustrated in FIG. 1, a vehicular seat 14 is provided in a vehicle 12 in which the occupant restraint system 10 for the vehicle according to the embodiment is adopted. The vehicular seat 14 is configured to include a seat cushion 16 that is able to support the buttocks and thighs of an occupant P from a lower side of the vehicular seat 14, and a seat back 18 that is coupled to a rear end portion of the seat cushion 16 and that is able to support the back of the occupant P. A headrest 20 that is able to support the head of the occupant P is provided on an upper end portion of the seat back 18.

A seat belt device 22 is provided in the vehicular seat 14. The seat belt device 22 includes a webbing 24, a tongue portion 26, a buckle 28, and a retractor 30 that serves as a winding device.

The webbing 24 is formed to have a long band shape. One end of the webbing 24 is wound around a spool 30A of the retractor 30, described below. The webbing 24 is pulled out of the retractor 30 in the upward direction. The webbing 24 is set over a belt guide 34 provided in the vehicle 12 and is extended obliquely from the right shoulder towards the left side of the waist of the occupant P that is sitting on a right side seat.

Here, the webbing 24 is passed through the tongue portion 26. The tongue portion 26 is engaged with the buckle 28 that is provided on the vehicular seat 14 and that is at a position of the waist of the occupant P. The webbing 24 is folded back at the tongue portion 26 and is extended to the right side of the vehicular seat 14 and the other end of the webbing 24 is fixed to an anchor 32 provided on a floor portion of the vehicle 12. With the webbing 24, it is possible to restrain the occupant P who is seated on the vehicular seat 14. In the webbing 24, a part that is extended obliquely in front of the upper body of the occupant P is a shoulder belt portion 24A and a part that is extended transversely over the waist of the occupant P is a lap belt portion 24B.

The spool 30A that is rotatable is provided inside the retractor 30. The one end of the webbing 24 is wound around the spool 30A. The spool 30A is connected to a retractor motor, not shown. The retractor motor is driven so that the spool 30A is rotated in a winding direction or a pulling-out direction. A pretensioner, not shown, is provided in the retractor 30. The retractor 30 is configured such that the pretensioner is operated so that the spool 30A is forced to rotate in the winding direction and a tensile force of the webbing 24 is increased in case of a vehicle collision etc.

Figure 2:
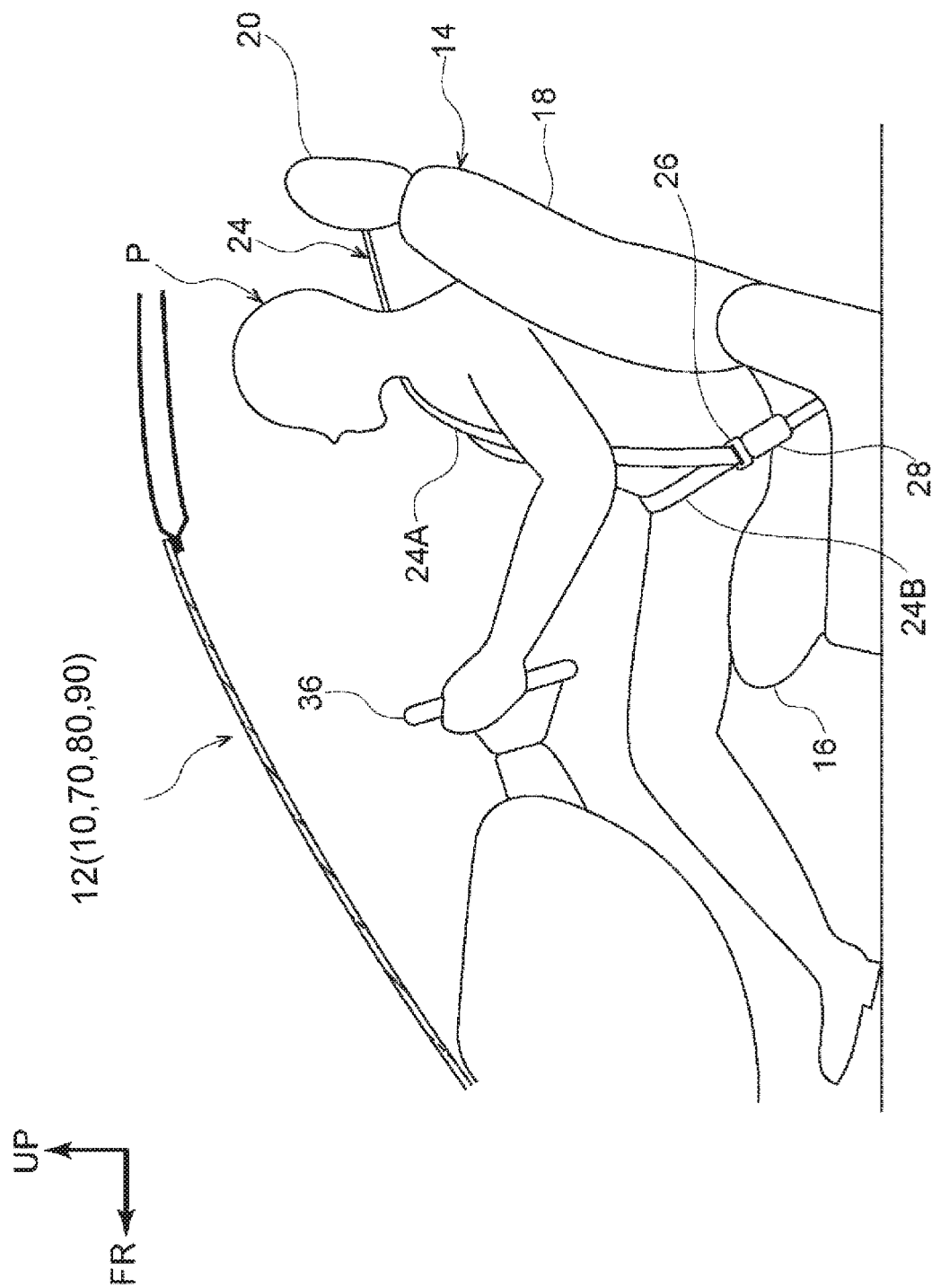
FIG. 2 is a schematic side view of the inside of a cabin of the vehicle in which the occupant restraint system for the vehicle according to the first embodiment is applied, as seen from a vehicle width direction.

As illustrated in FIG. 2, the vehicular seat 14 of the embodiment is a seat provided in a position of a driver's seat of a right-hand drive vehicle and a steering wheel 36 is provided in front of the vehicular seat 14. When the occupant P grips the steering wheel 36 and steers the steering wheel 36 to the right or left, the vehicle 12 is turned to the right or left.

Figure 3:
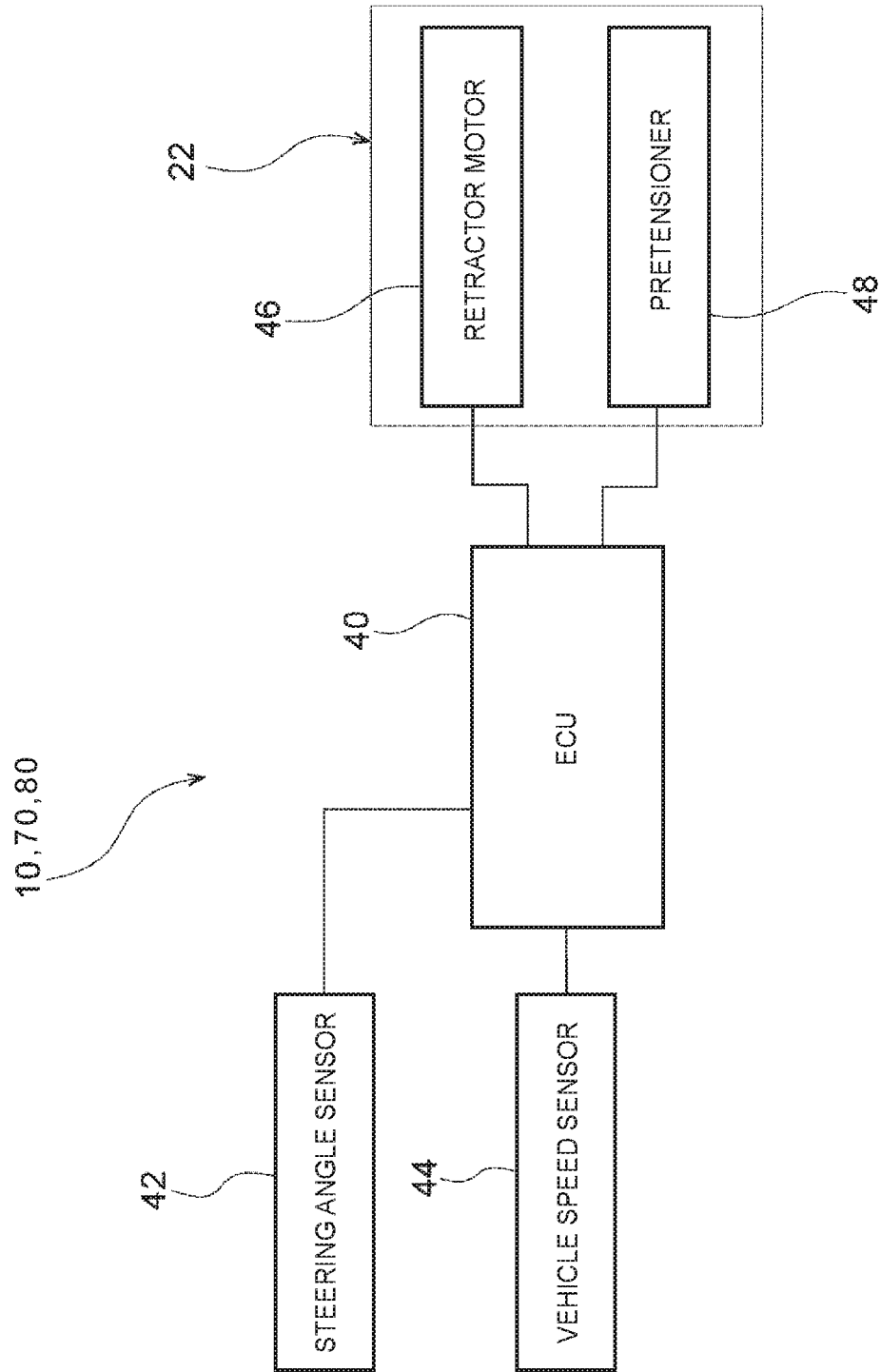
FIG. 3 is a block diagram of a hardware structure of the occupant restraint system for the vehicle according to the first embodiment.

FIG. 3 is a block diagram illustrating a hardware configuration of the occupant restraint system 10 for the vehicle. As illustrated in FIG. 3, the occupant restraint system 10 for the vehicle has an electronic control unit (ECU) 40. The ECU 40 is electrically connected to a steering angle sensor 42, a vehicle speed sensor 44, a retractor motor 46, and a pretensioner 48.

The steering angle sensor 42 is a sensor that detects a steering angle of the steering wheel 36. The vehicle speed sensor 44 is sensor that detects a speed of the vehicle 12. The steering angle detected by the steering angle sensor 42 and the vehicle speed detected by the vehicle speed sensor 44 are input to the ECU 40.

The retractor motor 46 is driven by, signals from the ECU 40 so that the spool 30A is rotated in the winding direction or the pulling-out direction. The webbing 24 is thus wound around the retractor 30 or the webbing 24 is pulled out of the retractor 30. The pretensioner 48 is operated by signals from the ECU 40 so as to force the spool 30A to rotate in the winding direction.

Figure 4:
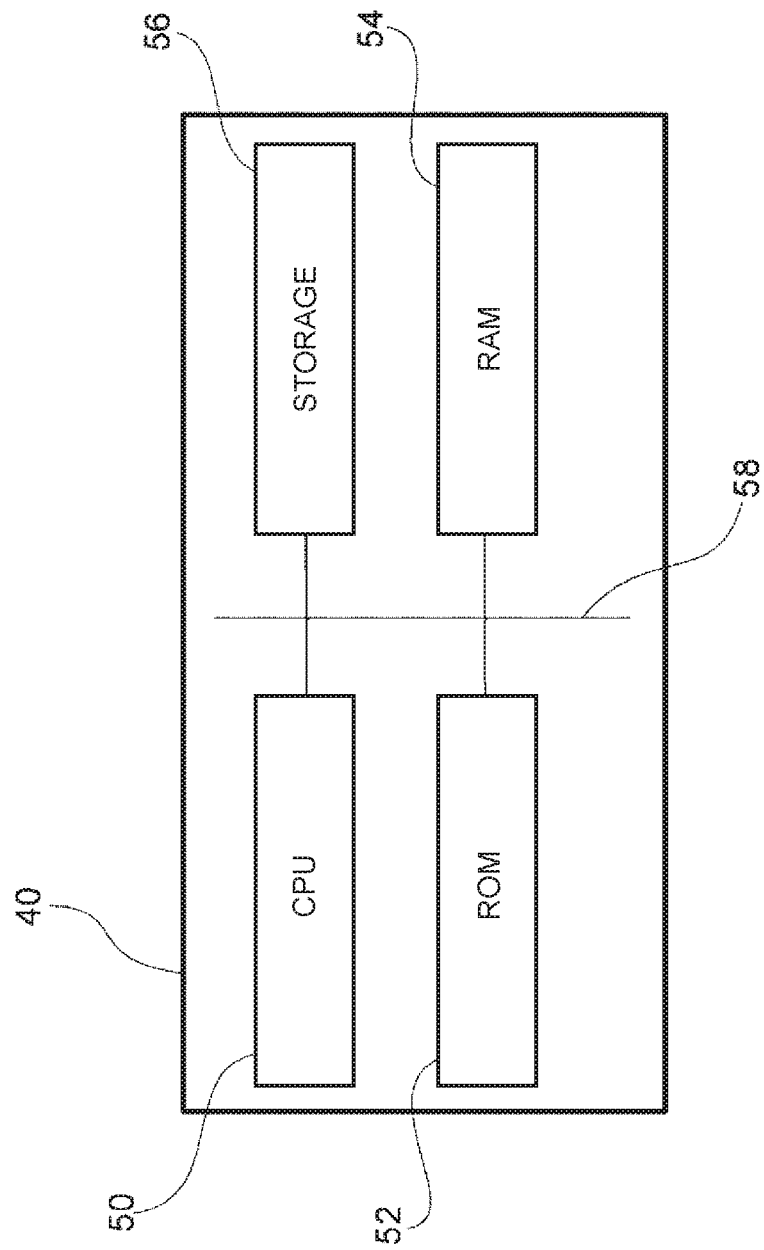
FIG. 4 is a block diagram of a hardware structure of an electronic controller unit (ECU) that forms the occupant restraint system for the vehicle according to the first embodiment.

FIG. 4 is a block diagram illustrating a hardware configuration of the ECU 40. As illustrated in FIG. 4, the ECU 40 includes a central processing unit (CPU, that is, a processor) 50, a read-only memory (ROM) 52, a random access memory (RAM) 54, and a storage 56. The components are connected to each other via a bus 58 so as to be able to communicate with each other.

The CPU 50 is a central computation processing unit. The CPU 50 executes various programs and controls each part. That is, the CPU 50 reads a program from the ROM 52 or the storage 56 so as to execute the program using the RAM 54 as a work area. The CPU 50 follows the program stored in the ROM 52 or the storage 56 so as to control the components and perform various computing processes.

The ROM 52 stores various programs and various data. The RAM 54 temporarily stores a program or data as a work area. The storage 56 is configured of a hard disk drive (HDD) or a solid state drive (SSD). The storage 56 stores various programs including an operating system, and various data.

The occupant restraint system 10 for the vehicle uses hardware resources illustrated in FIGS. 3 and 4 to realize various functions. The function configuration realized by the occupant restraint system 10 for the vehicle will be described with reference to FIG. 5.

Figure 5:
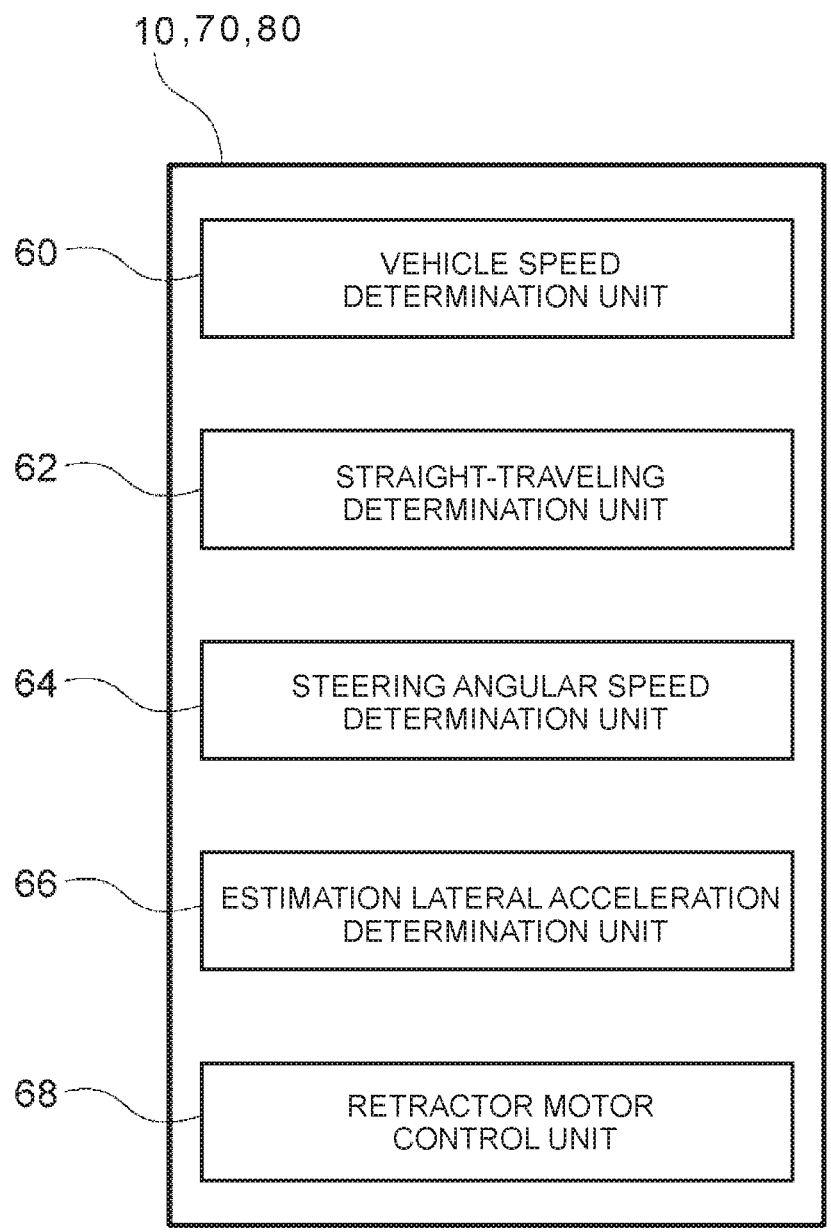
FIG. 5 is a block diagram of a function configuration of the occupant restraint system for the vehicle according to the first embodiment.

As illustrated in FIG. 5, the occupant restraint system 10 for the vehicle includes, as the function configuration, a vehicle speed determination unit 60, straight-traveling determination unit 62, a steering angular speed determination unit 64, an estimation lateral acceleration determination unit 66, and a retractor motor control unit 68. The CPU 50 of the ECU 40 reads and executes the programs stored in the ROM 52 or the storage 56 so as to realize the function configurations.

The vehicle speed determination unit 60 determines whether the vehicle speed of the vehicle 12 detected by the vehicle speed sensor 44 is equal to or more than a prescribed vehicle speed threshold. The straight-traveling determination unit 62 determines whether the vehicle 12 is traveling straight. Specifically, the straight-traveling determination unit 62 determines whether an absolute value of the steering angle of the steering wheel 36 detected by the steering angle sensor 42 is smaller than a prescribed threshold (straight-traveling threshold). The straight-traveling threshold is set between thirty and forty-five degrees, for example.

The steering angular speed determination unit 64 determines whether a steering angular speed is equal to or more than a prescribed steering angular speed threshold. In the embodiment, the steering angular speed is calculated based on the steering angle of the steering wheel 36 detected by the steering angle sensor 42. Specifically, the steering angular speed is calculated by differentiating the steering angle.

The estimation lateral acceleration determination unit 66 determines whether an estimated lateral acceleration that is estimated to act on the vehicle 12 is equal to or more than a prescribed acceleration threshold. In the embodiment, the estimated lateral acceleration is calculated based on the vehicle speed, detected by the vehicle speed sensor 44 and the steering angle detected by the steering angle sensor 42. Specifically, the estimated lateral acceleration a is calculated with the following formula (1) wherein the vehicle speed is indicated as V and the steering angle is indicated as θ. A coefficient k is determined by the shape of the vehicle 12, and is determined by a wheelbase for example.

$$\alpha = V^2 \times \theta \times k \tag{1}$$

The retractor motor control unit 68 controls the direction and amount of the rotation of the spool 30A caused by the retractor motor 46 of the seat belt device 22.

A flow of an occupant restraint process by the occupant restraint system 10 for the vehicle will be described below with reference to the flowchart in FIG. 6. For example, the occupant restraint process is performed by the CPU 50 reading the program from the ROM 52 or the storage 56, loading the program into the RAM 54, and executing the program.

Figure 6:
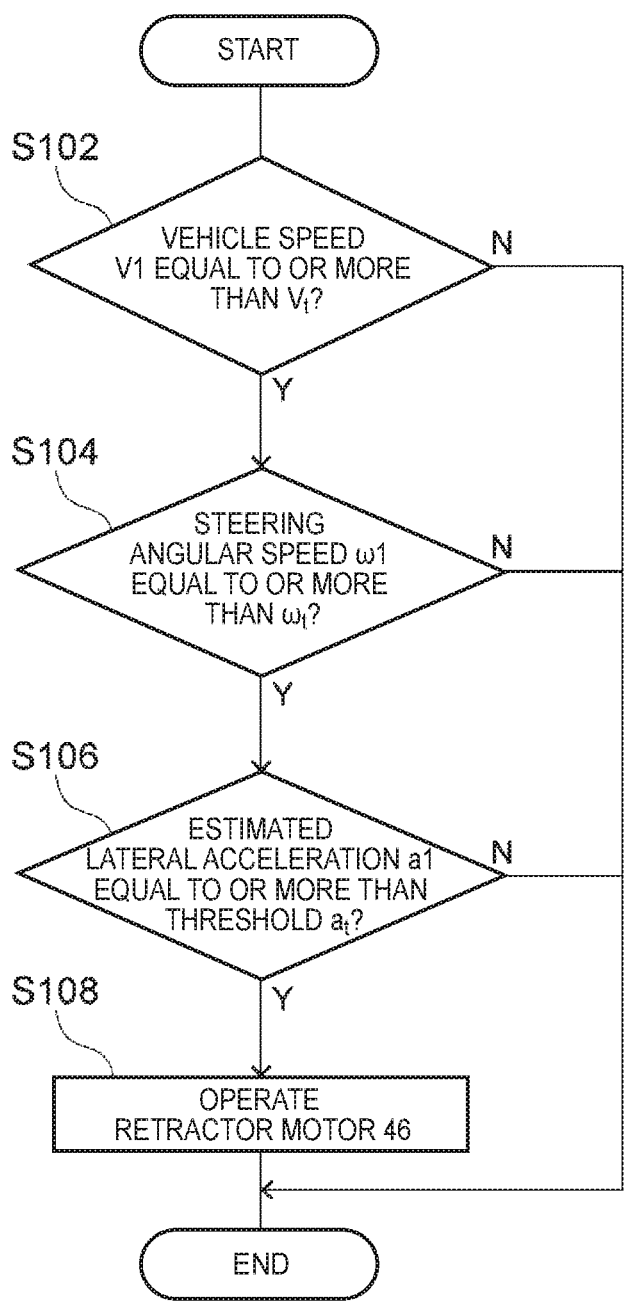
FIG. 6 is a flowchart illustrating a flow of an occupant restraint process according to the first embodiment.

As illustrated in FIG. 6, in step S102, the CPU 50 determines whether a vehicle speed VI of the vehicle 12 detected by the vehicle speed sensor 44 is equal to or more than a vehicle speed threshold $V_t$. When the vehicle speed VI is equal to or more than the vehicle speed threshold $V_t$, the CPU 50 then moves on to step S104. When the vehicle speed VI is less than the vehicle speed threshold $V_t$, the CPU 50 ends the process.

In step S104, the CPU 50 determines whether a steering angular speed $\omega_1$ is equal to or more than a steering angular speed threshold $\omega_t$. Here, the steering angular speed $\omega 1$ is calculated from a steering angle $\theta 1$ of the steering wheel 36 detected by the steering angle sensor 42. When the steering angular speed $\omega 1$ is equal to or more than the steering angular speed threshold $\omega_t$, the CPU 50 moves on to step S106. When the steering angular speed $\omega 1$ is less than the steering angular speed threshold $\omega_t$, the CPU 50 ends the process.

In step S106, the CPU 50 determines whether an estimated lateral acceleration a1 is equal to or more than an acceleration threshold $a_t$. Here, the estimated lateral acceleration a1 is estimated to act on the vehicle 12. When the estimated lateral acceleration a1 is equal to or more than the acceleration threshold $a_t$, the CPU 50 moves on to step S108. When the estimated lateral acceleration a1 is less than the acceleration threshold $a_t$, the CPU 50 ends the process. In the embodiment, the estimated lateral acceleration a1 is calculated from the formula (1) described above based on the vehicle speed V1 and the steering angle $\theta 1$.

In step S108, the CPU 50 causes the retractor motor 46 to operate. Here, with the function of the retractor motor control unit 68, the CPU 50 controls the retractor motor 46 so that the spool 30A is rotated in the winding direction for a prescribed amount.

As described above, in the occupant restraint process of the embodiment, suppose the vehicle speed V1 is equal to or more than the vehicle speed threshold $V_t$, the steering angular speed $\omega 1$ is equal to or more than the steering angular speed threshold $\omega_t$, and the estimated lateral acceleration a1 is equal to or more than the acceleration threshold $a_t$. In this case, a prescribed amount of the webbing 24 is wound. In this way, the tensile force of the webbing 24 is increased and an inertial, movement of the occupant P is suppressed.

The operation of the embodiment will be described.

In the occupant restraint system 10 for the vehicle according to the embodiment, the retractor motor 46 is provided in the retractor 30 of the seat belt device 22, as illustrated in FIGS. 1 and 3. The retractor motor 46 is driven so that the spool 30A is rotated in the winding direction, and the webbing 24 is wound. With this configuration, when a large acceleration is generated in the vehicle 12, the tensile force of the webbing 24 is increased so as to suppress the inertial movement of the occupant P.

Here, the occupant restraint system 10 for the vehicle drives the retractor motor 46 when the vehicle speed V1 is equal to or more than the vehicle speed threshold $V_t$, the steering angular speed $\omega 1$ is equal to or more than the steering angular speed threshold $\omega_t$, and the estimated lateral acceleration a1 is equal to or more than the acceleration threshold $a_t$. In this way, by adding the estimated lateral acceleration a1 to the conditions for driving the retractor motor 46, it is possible to cause the webbing 24 to be wound when it is estimated that the occupant P will move inertially in a vehicle width direction. As a result, it is possible to maintain comfortability and occupant protection performance.

In the embodiment, the steering angular speed $\omega 1$ is calculated from the steering angle $\theta 1$ and the estimated lateral acceleration a1 is calculated from the steering angle $\theta 1$ and the vehicle speed VI. In this way, it is possible to drive the retractor motor 46 of the retractor 30 before an input of the lateral, acceleration is actually received by the vehicle 12. That is, it is possible to restrain the occupant P before the occupant P moves inertially.

Second Embodiment

An occupant restraint system 70 for a vehicle according to a second embodiment will be described below with reference to FIGS. 7 to 9. Components that are similar to those in the first embodiment are given the same signs to omit description.

The configuration of the occupant restraint system for the vehicle of the embodiment is similar to that of the first embodiment, except for the flow of the occupant restraint process. Thus, in the description below, only the flow of the occupant restraint process will be described with reference to the flowcharts in FIGS. 7 to 9.

Figure 7:
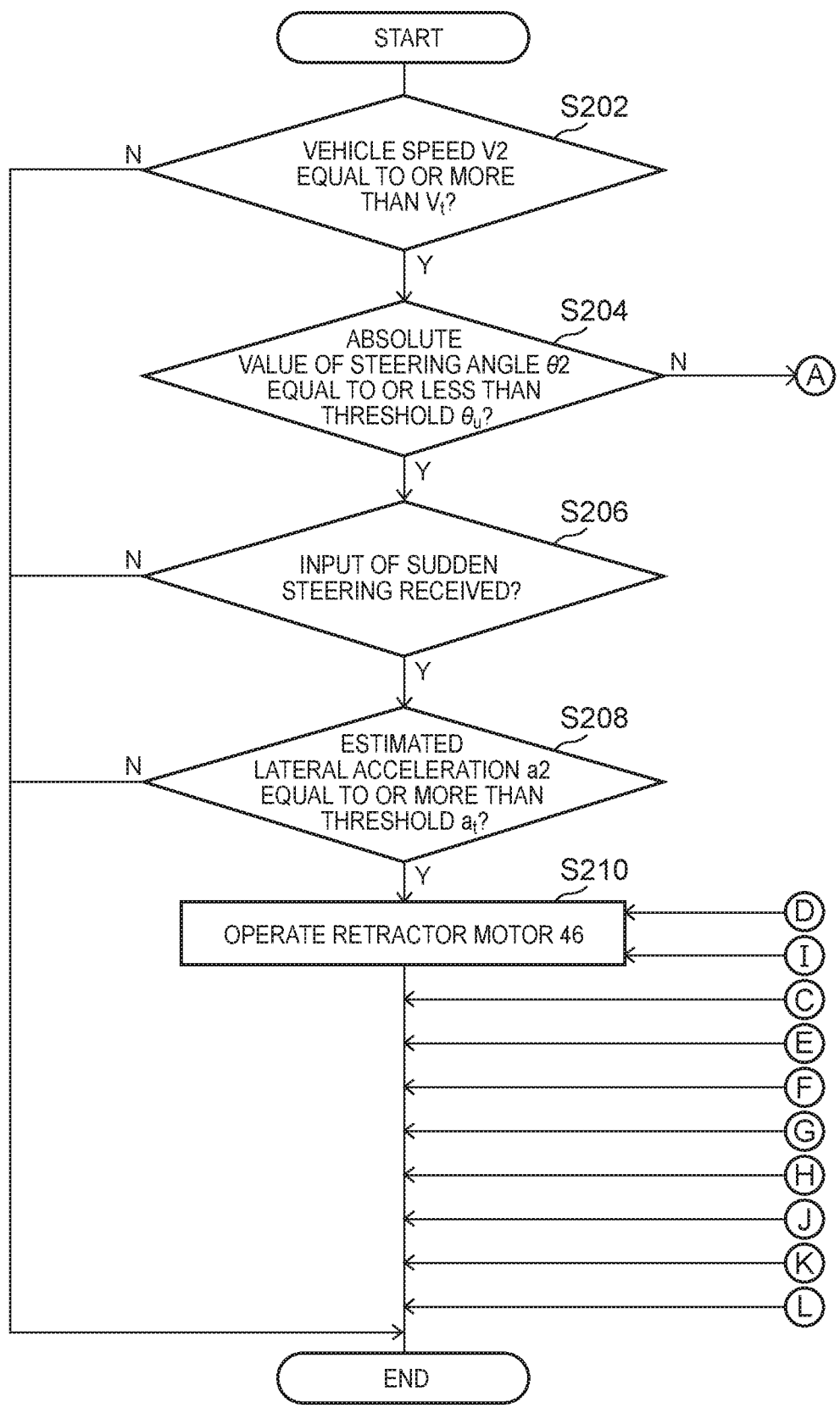
FIG. 7 is a partial flowchart illustrating a flow of an occupant restraint process according to a second embodiment.

As illustrated in FIG. 7, in step S202, the CPU 50 determines whether a vehicle speed V2 of the vehicle 12 detected by the vehicle speed sensor 44 is equal to or more than the vehicle speed threshold $V_t$. When the vehicle speed V2 is equal to or more than the vehicle speed threshold $V_t$, the CPU 50 then moves on to step S204. When the vehicle speed V2 is less than the vehicle speed threshold $V_t$, the CPU 50 ends the process.

In step S204, the CPU 50 determines whether an absolute value |$\theta 2$| of a steering angle $\theta 2$ of the steering wheel 36 detected by the steering angle sensor 42 is equal to or less than a threshold $\theta_u$. When the steering angle absolute value |$\theta 2$| is equal to or less than the threshold $\theta_u$, the CPU 50 moves on to step S206, and when the steering angle absolute value |$\theta 2$| is more than the threshold $\theta_u$, the CPU 50 moves on to step S212 (see FIG. 8).

In step S206, the CPU 50 determines whether an input of a sudden steering has been received. That is, when a large steering, angular speed is detected, the CPU 50 assumes that an input of a sudden steering has been received and moves on to step S208. When a large steering angular speed is not detected, the CPU 50 ends the process.

In step S208, the CPU 50 determines whether an estimated lateral acceleration a2 is equal to or more than an acceleration threshold $a_t$. Here, the estimated lateral acceleration a2 is estimated to act on the vehicle 12. The estimated lateral acceleration a2 is calculated from the formula (1) described above based on the vehicle speed V2 and the steering angle $\theta 2$.

When the estimated lateral acceleration a2 is equal to or more than the acceleration threshold $a_t$ in step S208, the CPU 50 then moves on to step S210. When the estimated lateral acceleration a2 is less than the acceleration threshold $a_t$ in step S208, the CPU 50 ends the process.

In step S210, the CPU 50 causes the retractor motor 46 to operate. Here, with the function of the retractor motor control unit 68, the CPU 50 controls the retractor motor 46 so that the spool 30A is rotated in the winding, direction for a prescribed amount. The process is then ended.

In this way, in step S204, when the steering angle absolute value |$\theta 2$| is equal to or less than the threshold $\theta_u$ that is, when the vehicle 12 is traveling straight, a process similar to the first embodiment is performed.

In contrast, when the steering angle absolute value |$\theta 2$| is more than the threshold $\theta_u$ as described above, the CPU 50 moves on the step S212. As illustrated in FIG. 8, in step S212, the CPU 50 determines whether the steering angle $\theta 2$ is more than zero. In the embodiment, when the steering angle $\theta 2$ is a positive value, with reference to the case in which the steering angle $\theta 2$ is zero degrees, it is assumed that leftward steering is performed. When the steering angle $\theta 2$ is a negative value, with reference to a similar case, it is assumed that rightward steering is performed.

Figure 9:
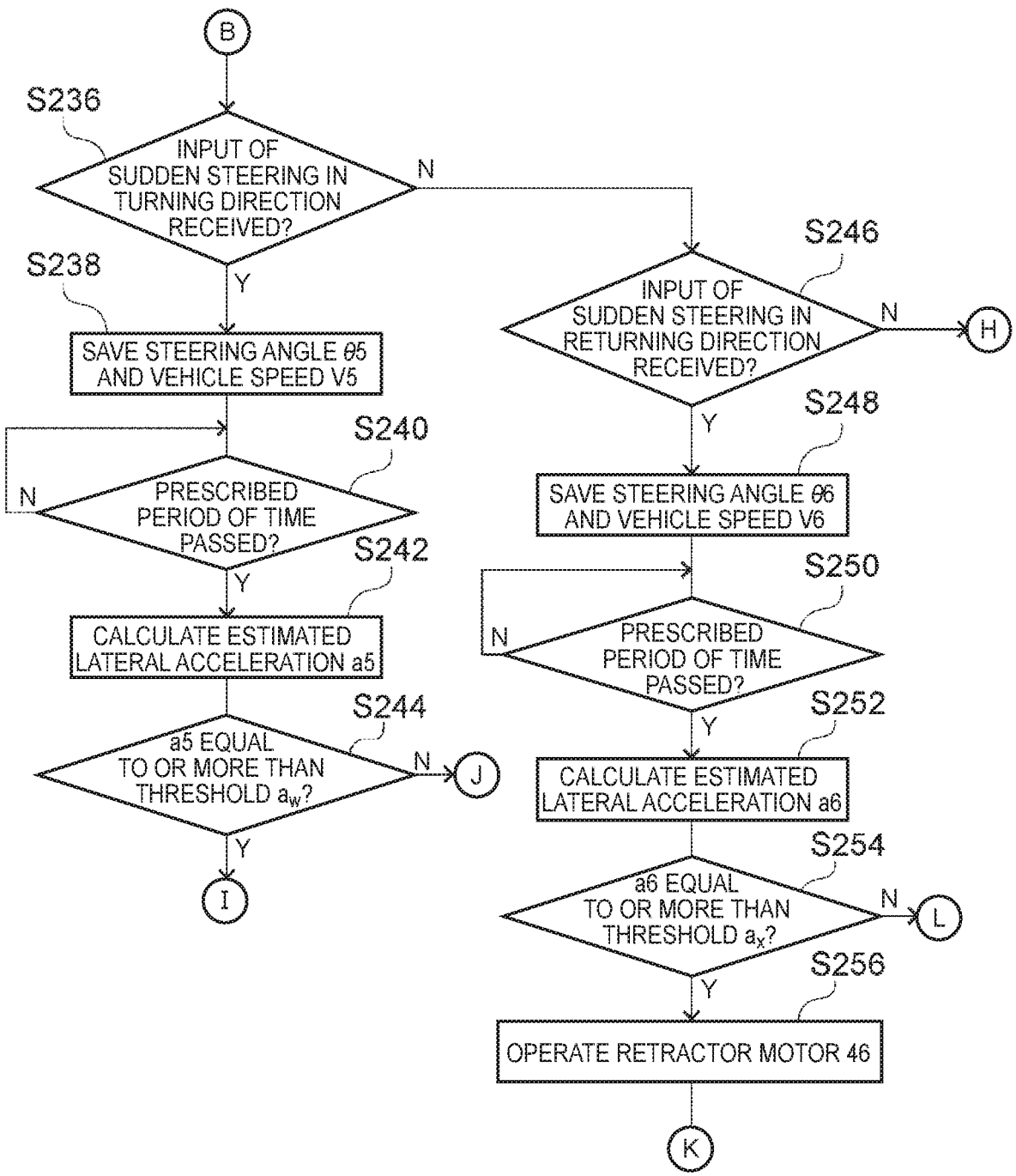
FIG. 9 is a partial flowchart illustrating the flow of the occupant restraint process according to the second embodiment.

When the steering angle θ2 is larger than zero in step S212, the CPU 50 moves on to step S236 (see FIG. 9). When the steering angle θ2 is smaller than zero in step S212, the CPU 50 moves on to step S214.

In step S214, the CPU 50 determines whether an input of a sudden steering in a turning direction is received. That is, since rightward steering is being performed, the CPU 50 determines whether an input of a sudden rightward steering from this state is further received, in step S214.

In step S214, when a sudden rightward steering is performed, the CPU 50 assumes that an input of a sudden steering in the turning direction is received and moves on to step S216. In step S214, when an input of a sudden rightward steering is not received, the CPU 050 moves on to step S224.

In step S216, the CPU 50 saves a steering angle θ3 and a vehicle speed V3 at the present time. That is, the CPU 50 saves the steering angle θ3 and the vehicle speed V3 in the ROM 52, the storage 56, or the RAM 54.

In step S218, the CPU 50 determines whether a prescribed period of time has passed. When the prescribed period of time has passed from when an input of a sudden steering in the turning direction is received, the CPU 50 moves on to step S220.

In step S220, the CPU 50 calculates an estimated lateral acceleration a3 that is estimated to act on the vehicle 12. In the embodiment, the vehicle speed V3 saved in step S216 or the current vehicle speed is used as the vehicle speed. An amount of change Δθ of a steering angle after the prescribed period of time has passed, with reference to the steering angle θ3 saved in step S216, is used as the steering angle. After calculating the estimated lateral acceleration a3, the CPU 50 moves on to the process in step S222.

In step S222, the CPU 50 determines whether the estimated lateral acceleration a3 is equal to or more than an acceleration threshold $a_u$. When the estimated lateral acceleration a3 is equal to or more than the acceleration threshold $a_u$, the CPU 50 moves on to step S210 so as to operate the retractor motor 46. That is, with the function of the retractor motor control unit 68, the CPU 50 controls the retractor motor 46 so that the spool 30A is rotated in the winding direction for a prescribed amount. When the estimated lateral acceleration a3 is less than the acceleration threshold $a_u$, the CPU 50 ends the process (see FIG. 7).

As described above, suppose an input of a sudden steering in the turning direction is received while rightward steering is being performed. In such a case, a prescribed amount of the webbing 24 is wound when the amount of change of the steering angle becomes large after the prescribed period of time has passed, so as to increase a restraining force of the occupant P.

In step S214, when an input of a sudden rightward steering is not received the CPU 50 moves on to step S224 and determines whether an input of a sudden steering in a returning direction is received. That is, in step S224, the CPU 50 determines whether an input of a sudden steering to the left, which is a reverse direction, is received from a state in which rightward steering is being performed.

In step S224, when an input of a sudden leftward steering is received the CPU 50 assumes that an input of a sudden steering in the returning direction has been received and moves on to step S226. In step S224, when an Input of a sudden leftward steering is not received the CPU 50 ends the process (see FIG. 7).

In step S226, the CPU 50 saves a steering angle θ4 and a vehicle speed V4 at the present time. That is, the CPU 50 saves the steering angle θ4 and the vehicle speed V4 in the ROM 52, the storage 56, or the RAM 54.

In step S228, the CPU 50 determines whether a prescribed period of time has passed. When the prescribed period of time has passed from when an input of a sudden steering in the returning direction is received, the CPU 50 moves on to step S230.

In step S230, the CPU 50 calculates an estimated lateral acceleration a4 that is estimated to act on the vehicle 12. In the embodiment, the vehicle speed V4 saved in step S226 or the current vehicle speed is used as the vehicle speed. An amount of change Δθ of a steering angle after the prescribed period of time has passed, with reference to the steering angle θ4 saved in step S226, is used as the steering angle. After calculating the estimated lateral acceleration a4, the CPU 50 moves on to the process of step S232.

In step S232, the CPU 50 determines whether the estimated lateral acceleration a4 is equal to or more than an acceleration threshold $a_v$. When, the estimated lateral acceleration a4 is equal to or more than the acceleration threshold $a_v$, the CPU 50 moves on to step S234. When the estimated lateral acceleration a4 is less than the acceleration threshold $a_v$, the CPU 50 ends the process (see FIG. 7). In the embodiment, the acceleration threshold $a_v$ is set to be a value larger than the acceleration threshold $a_u$ (see step S222).

In step S234, the CPU 50 causes the retractor motor 46 to operate. That is, with the function of the retractor motor control unit 68, the CPU 50 controls the retractor motor 46 so that the spool 30A is rotated in the winding direction for a prescribed amount. In the embodiment, a winding amount of the webbing 24 in step S234 is controlled so as to be less than a winding amount of the webbing 24 in step S210.

As described above, suppose an input of a sudden steering in the returning direction is received while rightward steering is being performed. In such a case, a prescribed amount of the webbing 24 is wound when the amount of change of the steering angle becomes large after the prescribed period of time has passed, so as to increase a restraining force of the occupant P. The winding amount of the webbing 24 in this case is set to be less than the winding amount thereof when an input of a sudden steering in the turning direction is received.

When the steering angle θ2 is larger than zero in step S212, the CPU 50 moves on to step S236. As illustrated in FIG. 9, in step S236, the CPU 50 determines whether an input of a sudden steering in the turning direction is received. That is, since it has been determined that leftward steering is being performed, the CPU 50 determines in step S236 whether an input of a sudden leftward steering is further received.

In step S236, when an input of a sudden leftward steering is received, the CPU 50 assumes that an input of a sudden steering in the turning direction has been received and moves on to step S238. In step S236, when an input of a sudden leftward steering is not received, the CPU 50 moves on to step S246.

In step S238, the CPU 50 saves a steering angle θ5 and a vehicle speed V5 at the present time. That is, the CPU 50 saves the steering angle θ5 and the vehicle speed V5 in the ROM 52, the storage 56, or the RAM 54.

In step S240, the CPU 50 determines whether a prescribed period of time has passed. When the prescribed period of time has passed from when an input of a sudden steering in the turning direction is received, the CPU 50 moves on to step S242.

In step S242, the CPU 50 calculates an estimated lateral acceleration a5 that is estimated to act on the vehicle 12. In the embodiment, the vehicle speed V5 saved in step S238 or the current vehicle speed is used as the vehicle speed. An amount of change Δθ of a steering angle after the prescribed period of time has passed, with reference to the steering angle θ5 saved in step S238, is used as the steering angle. After calculating the estimated lateral acceleration a5, the CPU 50 moves on to the process of step S244.

In step S244, the CPU 50 determines whether the estimated lateral acceleration a5 is equal to or more than an acceleration threshold $a_w$. When the estimated lateral acceleration a5 is equal to or more than the acceleration threshold $a_w$, the CPU 50 moves on to step S210 so as to operate the retractor motor 46. That is, with the function of the retractor motor control unit 68, the CPU 50 controls the retractor motor 46 so that the spool 30A is rotated in the winding direction for a prescribed amount. When the estimated lateral acceleration a5 is less than the acceleration threshold $a_w$, the CPU 50 ends the process (see FIG. 7).

As described above, suppose an input of a sudden steering in the turning direction is received while leftward steering is being performed. In such a case, a prescribed amount of the webbing 24 is wound when the amount of change of the steering angle becomes large after the prescribed period of time has passed, so as to increase the restraining force of the occupant P.

In step S236, when an input of a sudden leftward steering is not received, the CPU 50 moves on to step S246 and determines whether an input of a sudden steering in a returning direction is received. That is, in step S246, the CPU 50 determines whether an input of a sudden steering to the right, which is a reverse direction, is received from a state in which leftward steering is being performed.

In step S246, when an input of a sudden rightward steering is received, the CPU 50 assumes that an input of a sudden steering in the returning direction has been received and moves on to step S248. In step S246, when an input of a sudden leftward steering is not received, the CPU 50 ends the process (see FIG. 7).

In step S248, the CPU 50 saves a steering angle θ6 and a vehicle speed V6 at the present time. That is, the CPU 50 saves the steering angle θ6 and the vehicle speed V6 in the ROM 52, the storage 56, or the RAM 54.

In step S250, the CPU 50 determines whether a prescribed period of time has passed. When the prescribed period of time has passed from when an input of a sudden steering in the returning direction is received, the CPU 50 moves on to step S252.

In step S252, the CPU 50 calculates an estimated lateral acceleration a6 that is estimated to act on the vehicle 12. In the embodiment, the vehicle speed V6 saved in step S248 or the current vehicle speed is used as the vehicle speed. An amount of change Δθ of a steering angle after the prescribed period of time has passed, with reference to the steering angle θ6 saved in step S248, is used as the steering angle. After calculating the estimated lateral acceleration a6, the CPU 50 moves on to the process of step S254.

In step S254, the CPU 50 determines whether the estimated lateral acceleration a6 is equal to or more than an acceleration threshold $a_x$. When the estimated lateral acceleration a6 is equal to or more than the acceleration threshold $a_x$, the CPU 50 moves on to step S256. When the estimated lateral acceleration a6 is less than the acceleration threshold $a_x$, the CPU 50 ends the process (see FIG. 7). In the embodiment, the acceleration threshold $a_x$ is set to be a value larger than the acceleration threshold $a_w$ (see step S244).

The CPU 50 causes the retractor motor 46 to operate in step S256. That is, with the function of the retractor motor control unit 68, the CPU 50 controls the retractor motor 46 so that the spool 30A is rotated in the winding direction for a prescribed amount. In the embodiment, a winding amount of the webbing 24 in step S256 is controlled so as to be less than the winding amount of the webbing 24 in step S210.

As described above, suppose an input of a sudden steering in the returning direction is received while leftward steering is being performed. In such a case, a prescribed amount of the webbing 24 is wound when the amount of change of the steering angle becomes large after the prescribed period of time has passed, so as to increase the restraining force of the occupant P. The winding amount of the webbing 24 in this case is set to be less than the winding amount thereof when an input of a sudden steering in the turning direction is received.

The operation of the embodiment will be described.

In the occupant restraint system 70 for the vehicle of the embodiment, the conditions for winding the webbing 24 are changed for when the vehicle 12 is traveling straight and when the vehicle 12 is steered to the right or left. In this way, it is possible to set the conditions for restraining the occupant P its detail. When the vehicle 12 is steered to the right or left, there is a possibility that a steering angular speed and an estimated lateral acceleration exceed the steering angular speed threshold and the acceleration threshold respectively, even if only a slight amount of steering is performed. In such a case, the retractor motor 46 is driven when an amount of change of a steering angle becomes large, with reference to a state in which a steering angular speed is equal to or more than the steering angular speed threshold, in the embodiment. Thus, it is possible to suppress the retractor motor 46 from being driven unnecessarily, even while steering is performed to the right or left.

In the embodiment, when the vehicle 12 is being steered to the right or left, the estimated lateral acceleration is calculated based on a vehicle speed and the amount of change of a steering angle, with reference to a state in which the vehicle 12 is being steered. Here, the estimated lateral acceleration is set as the condition for driving the retractor motor 46. In this way, even when an input of a slight amount of steering is received while steering is performed to the right or left, it is possible to suppress the retractor motor 46 from being driven. As a result, it is possible to improve the comfortability of the occupant P.

Suppose steering is performed in a reverse direction (returning direction) of the steering direction while steering is being performed to the right or left. In such a case, the winding amount of the webbing 24 is reduced in the embodiment, compared to when steering is performed in the same direction (turning direction) as the steering direction. When steering is performed in the reverse direction of the steering direction, the amount of inertial movement of the occupant P is less than when steering is performed in the same direction as the steering direction. Thus, there is a possibility that this will cause the occupant P to feel uncomfortable when the tensile force of the webbing 24 is increased. Since the winding amount of the webbing 24 is reduced as in the embodiment, the restraining force of the occupant P thus does not become unnecessarily high.

Figure 8:
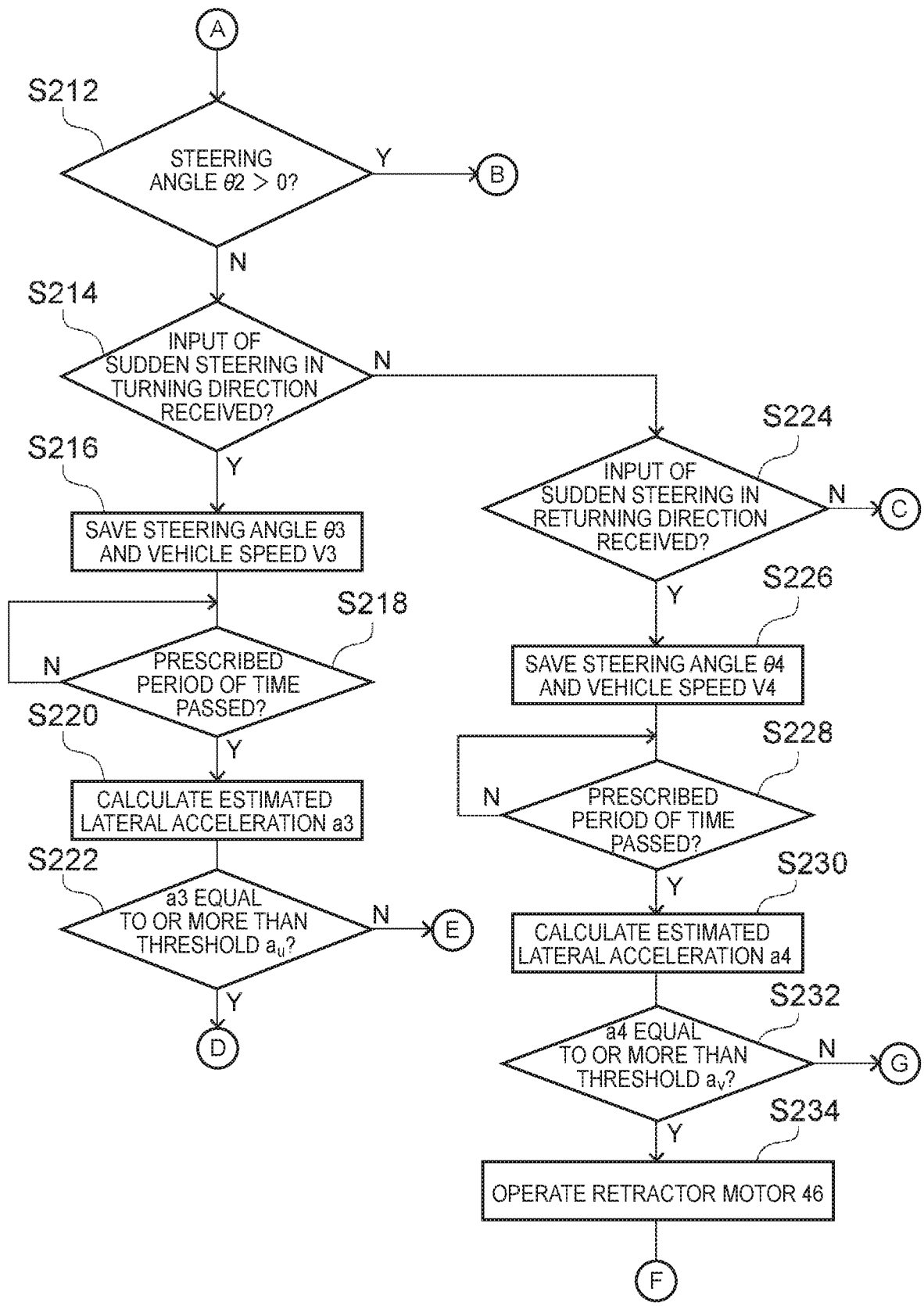
FIG. 8 is a partial flowchart illustrating the flow of the occupant restraint process according to the second embodiment.

In the embodiment, when rightward steering is being performed, the acceleration threshold $a_y$ when an input of a sudden steering in the returning direction is received (step S232) is set to be a value larger than the acceleration threshold $a_u$ when an input of a sudden steering in the turning direction is received (step S222), as illustrated in FIG. 8. Suppose an input of a lateral acceleration that is received when steering is performed in the reverse direction of the steering direction and an input of a lateral acceleration that is received when steering is performed in the same direction as the steering direction have the same value. Even, in such a case, the amount of inertial movement of the occupant P is smaller when steering is performed in the reverse direction of the steering direction. In the embodiment, it is thus possible to suppress the webbing from being wound when the amount of inertial movement of the occupant P is small, by setting different acceleration thresholds for when steering is performed in the reverse direction of the steering direction and when steering is performed in the same direction as the steering direction. As a result, it is possible to suppress the occupant from feeling uncomfortable.

An occupant restraint system for a vehicle according to a third embodiment will be described below with reference to FIGS. 10 and 11. Components that are similar to those in the second embodiment are given the same signs to omit description.

The configuration of the occupant restraint system 80 for the vehicle of the embodiment is similar to that of the second embodiment, except for the flow when steering is performed in the returning direction. Thus, in the description below, only the flow of the occupant restraint process will be described with reference to the flowcharts in FIGS. 10 and 11 based on the flowchart in FIG. 7.

Perform Steering in Returning Direction While Performing Rightward Steering

Figure 10:
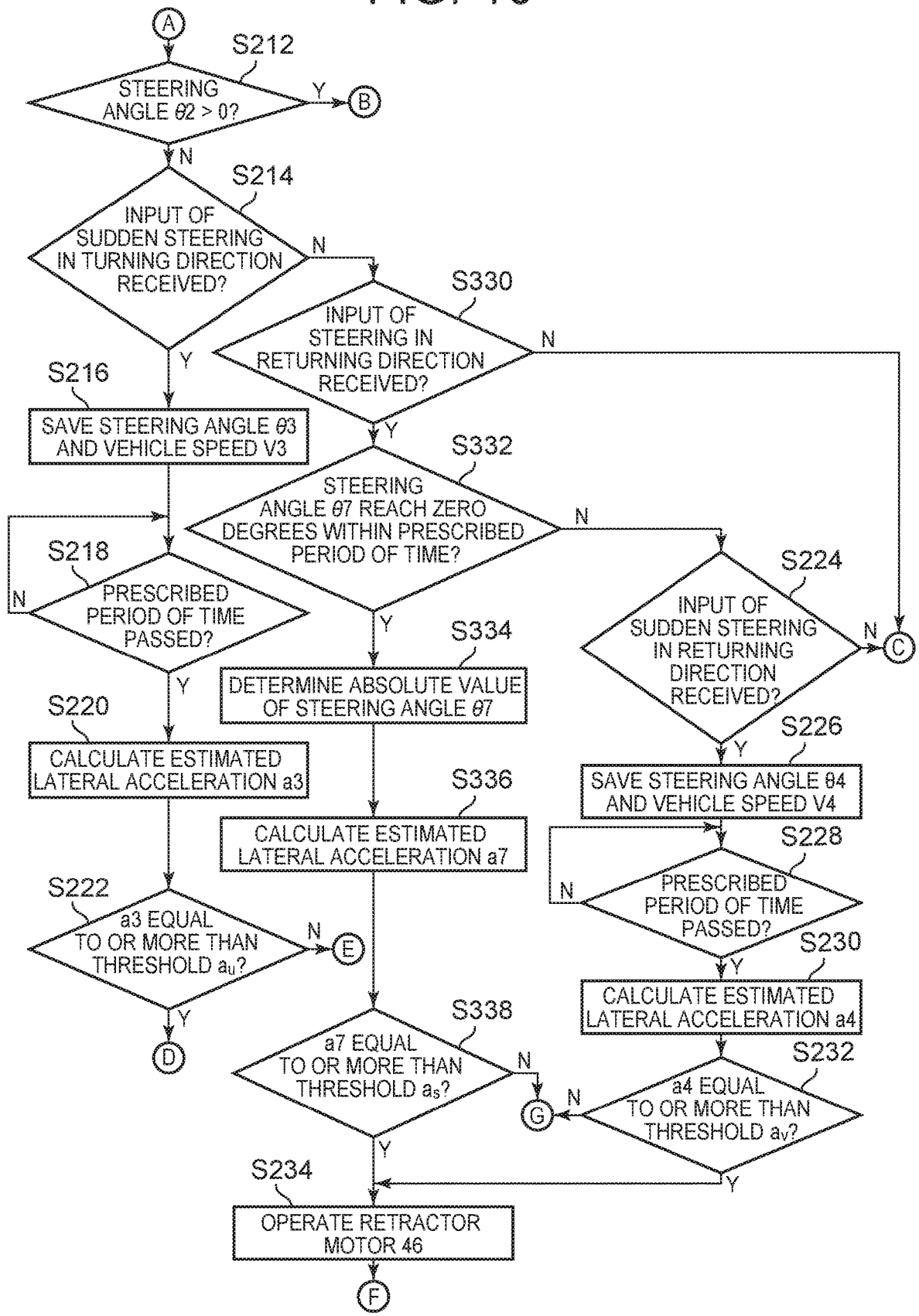
FIG. 10 is a partial flowchart illustrating a flow of an occupant restraint process according to a third embodiment.
Figure 11:
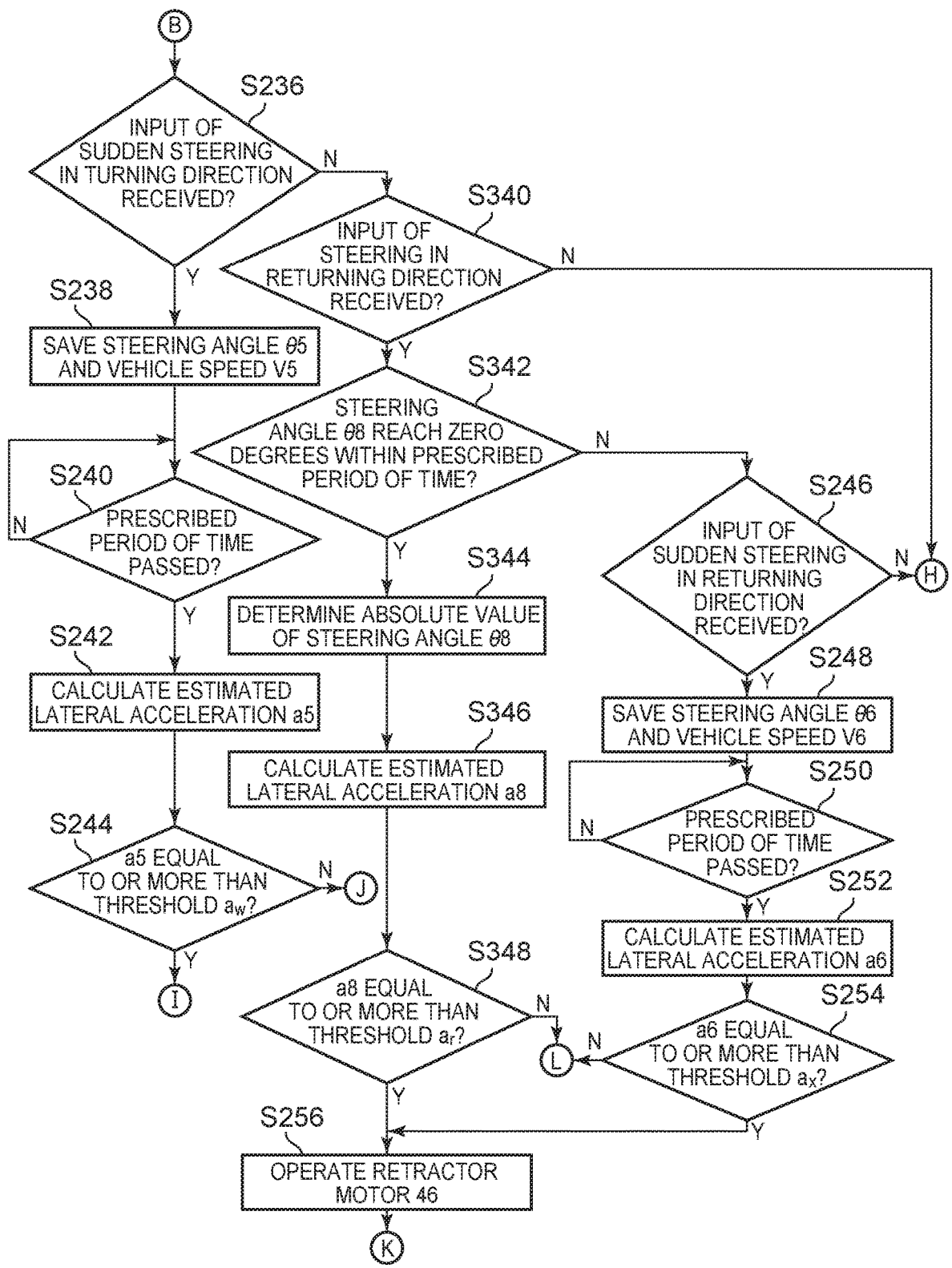
FIG. 11 is a partial flowchart illustrating the flow of the occupant restraint process according to the third embodiment.

In step S214, when an input of a sudden rightward steering is not received, the CPU 50 moves on to step S330 and determines whether an input of a sudden steering in a returning direction is received, as illustrated in FIG. 10. That is, in step S330, the CPU 50 determines whether an input of a steering to the left, which is a reverse direction, is received from a state in which leftward steering is being performed. Further, in step S330, the CPU 50 determines whether a steering angular speed is larger than a steering angular speed threshold when the input of a leftward steering is received.

In step S330, when an input of a sudden leftward steering is received, the CPU 50 assumes that an input of a steering in the returning direction has been received and moves on to step S332. In step S330, when an input of a sudden leftward steering is not received, the CPU 50 ends the process (see FIG. 7).

In step S332, the CPU 50 determines whether a steering angle θ7 of the steering wheel 36 detected by the steering angle sensor 42 within a prescribed period of time reaches a steering angle at which the vehicle is determined to be traveling straight, that is, whether the steering angle θ7 reaches zero degrees. In other words, the CPU 50 determines whether a positive/negative sign of the steering angle θ7 has changed. When the steering angle θ7 does not reach zero degrees within the prescribed period of time, the CPU 50 moves on to step S224.

When the steering angle θ7 reaches zero degrees within the prescribed period of time in step S332, the CPU 50 moves on to step S334, sets an absolute value of the steering angle θ7 as a determination element, and calculates an estimated lateral acceleration a7 in step S336. In the embodiment, the estimated lateral acceleration a7 is calculated from the formula (1) described above based on the vehicle speed V1 and an absolute value of the steering angle θ7.

In step S338, the CPU 50 determines whether the estimated lateral acceleration a7 is equal to or more than an acceleration threshold $a_s$. Here, the estimated lateral acceleration a7 is estimated to act on the vehicle 12. In the embodiment, the acceleration threshold $a_s$ is set to be a value larger than the acceleration threshold $a_u$ (see step S222) and also to be a value at which the occupant is estimated to move inertially in the vehicle width direction, at the estimated lateral acceleration a7 that is calculated from an absolute value of the steering angle θ7.

When the estimated lateral acceleration a7 is equal to or more than the acceleration threshold $a_s$ in step S338, the CPU 50 moves on to step S234. When the estimated lateral acceleration a7 is less than the acceleration threshold $a_s$ in step S338, the CPU 50 ends the process (see FIG. 7), Perform Steering in Returning Direction While Performing Leftward Steering In step S236, when an input of a sudden leftward steering is not received, the CPU 50 moves on to step S340 and determines whether an input of a steering in a returning direction is received as illustrated in FIG. 11. That is, in step S340, the CPU 50 determines whether an input of a steering to the right, which is a reverse direction, is received from a state in which leftward steering is being performed. Further, in step S340, the CPU 50 determines whether a steering angular speed is larger than a steering angular speed threshold when the input of a rightward steering is received.

In step S340, when an input of a sudden rightward steering is received, the CPU 50 assumes that an input of a steering in the returning direction has been received and moves on to step S342. In step S340, when an input of a sudden rightward steering is not received, the CPU 50 ends the process (see FIG. 7).

In step S342, the CPU 50 determines whether a steering angle θ8 of the steering wheel 36 detected by the steering angle sensor 42 within a prescribed period of time reaches zero degrees. In other words, the CPU 50 determines whether a positive/negative sign of the steering angle θ8 has changed. When the steering angle θ8 does not reach zero degrees within the prescribed period of time, the CPU 50 moves on to step S246.

When the steering angle θ8 reaches zero degrees within the prescribed period of time in step S342, the CPU 50 moves on to step S344, sets an absolute value of the steering angle θ8 as a determination element, and calculates an estimated lateral acceleration a8 in step S346. In the embodiment, the estimated lateral acceleration a8 is calculated from the formula (1) described above based on the vehicle speed V1 and an absolute value of the steering angle θ8.

In step S348, the CPU 50 determines Whether the estimated lateral acceleration a8 is equal to or more than an acceleration threshold $a_r$. Here, the estimated lateral acceleration a8 is estimated to act on the vehicle 12. In the embodiment, the acceleration threshold $a_r$ is set to be a value larger than the acceleration threshold $a_w$ (see step S244) and also to be a value at which the occupant is estimated to move inertially in the vehicle width direction at the estimated lateral acceleration a8 that is calculated from an absolute value of the steering angle θ8.

When the estimated lateral acceleration a8 is equal to or more than the acceleration threshold $a_r$ in step S348, the CPU 50 moves on to step S256. When the estimated lateral acceleration a8 is less than the acceleration threshold $a_r$ is step S348, the CPU 50 ends the process (see FIG. 7).

The operation of the embodiment will be described.

The configuration of the occupant restraint system 80 for the vehicle of the embodiment is similar to that of the occupant restraint system 70 for the vehicle according to the second embodiment, except that the estimated lateral accelerations a7, a8 are calculated when the steering angles θ7, θ8 reach zero degrees when steering is performed in the returning direction. Thus, similar effects to that of the second embodiment can be obtained. When steering is performed in the reverse direction (returning direction) of the steering direction while steering is being performed, the CPU 50 switches the determination element from the amount of change of the steering angle to absolute values of the steering angle θ7, θ8 within a prescribed period of time from when the steering angles θ7, θ8 reach zero degrees. That is, when steering is performed in the turning direction after steering is performed in the returning direction while steering is being performed, an amount of change of a steering angle while performing steering in the returning direction is taken into consideration. Thus, there is a possibility that at an early timing while steering is performed in the turning direction, the estimated lateral acceleration that is calculated based on the amount of change of the steering angle reaches a prescribed acceleration threshold and the webbing 24 is wound. The occupant that is moving it in the vehicle width direction returns to a basic position in the vehicle width direction at an early timing while steering is performed in the turning direction, that is, at the timing of transitioning from steering in the returning direction to steering in the turning direction. If the webbing 24 is wound at this timing, the occupant P feels uncomfortable. In contrast, suppose that the absolute values of the steering angles θ7, θ8 are set as the determination element within the prescribed period of time front when the steering angles θ7, θ8 reach zero degrees and the webbing 24 is wound when the estimated lateral accelerations a7, a8 that are calculated based on the vehicle speed and absolute values of the steering angles θ7, θ8 are equal to or more than a prescribed value. In such a case, it is possible that the webbing 24 is wound at a timing when steering is continuously performed in the turning direction and it is estimated that the occupant P moves inertially in the vehicle width direction, rather than at an early timing while steering is performed in the turning direction, that is, rather than at the timing of transitioning from steering in the returning direction to steering in the turning direction. In this way, it is possible to restrain the occupant P at an appropriate timing.

In the third embodiment, the occupant restraint system 80 is configured that when steering is performed in the reverse direction (returning direction) of the steering direction as in the second embodiment, the winding amount of the webbing 24 is reduced, compared to when steering is performed in the same direction (turning direction) as the steering direction while steering is being performed to the right or left. However, the configuration is not limited to this, and the occupant restraint system 80 may be configured that the winding amount is reduced. The acceleration threshold is set to be different when steering is performed in the returning direction and when steering is performed in the turning direction. However, the configuration is not limited to this, and the acceleration threshold may be set to be the same. The conditions for winding the webbing 24 are changed for when the vehicle 12 is traveling straight and for when the vehicle 12 is being steered to the right or left. However, the configuration is not limited to this. The occupant restraint system 80 may be configured that the conditions for winding the webbing 24 for when the vehicle 12 is traveling straight and the conditions for winding the webbing 24 for when the vehicle 12 is being steered to the right or left are the same and that absolute values of the steering angles θ7, θ8 are set to be the determination element within the prescribed period of time from when the steering angles θ7, θ8 reach zero degrees while steering is performed in the returning direction.

An occupant restraint system for a vehicle according to a fourth embodiment of the disclosure will be described with reference to FIGS. 12 to 15. Components that are similar to those in the first to third embodiments are given the same signs to omit description.

An occupant restraint system 90 according to the fourth embodiment has a similar basic configuration as that of the first embodiment. The occupant restraint system 90 is characterized in that the webbing 24 is wound when skidding of the vehicle 12 is detected or predicted.

Figure 12:
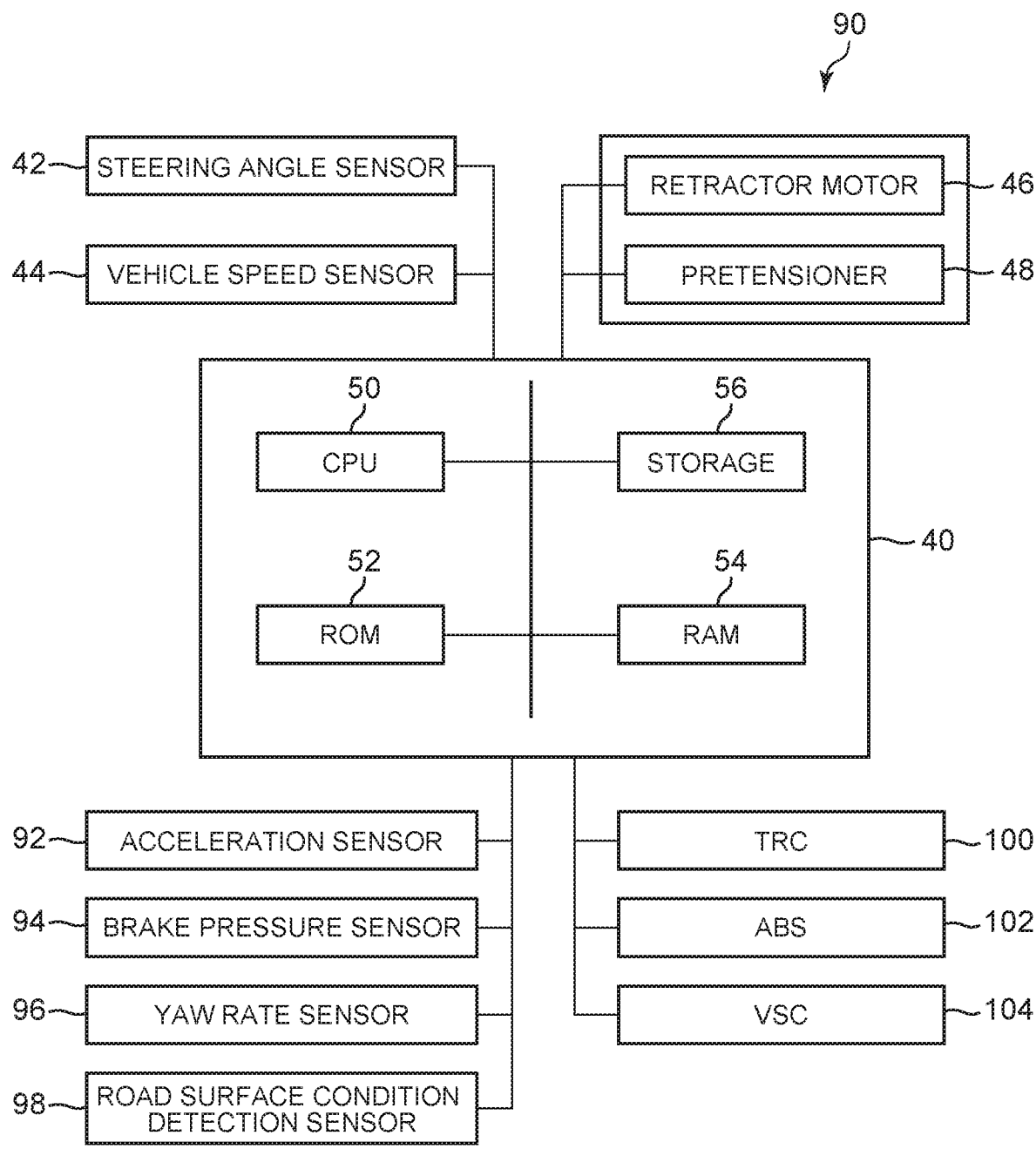
FIG. 12 is a block diagram of a hardware structure of the occupant restraint system for the vehicle according to a fourth embodiment.

That is, as illustrated in FIG. 12, the ECU 40 of the occupant restraint system 90 for the vehicle is electrically connected to the steering angle sensor 42, the vehicle speed sensor 44, the retractor motor 46, the pretensioner 48, an acceleration sensor 92, a brake pressure sensor 94, a yaw rate sensor 96, a road surface condition detection sensor 98, a traction control system (hereinafter simply referred to as "TRC") 100, an anti-lock brake system (hereinafter simply referred to as "ABS") 102, and a vehicle stability control system (hereinafter simply referred to as "VSC") 104.

The acceleration sensor 92 is a sensor that detects an acceleration of the vehicle 12 in the front-rear direction and the right-left direction. The brake pressure sensor 94 is a sensor that detects a brake hydraulic pressure resulting from brake operation of the driver. The yaw rate sensor 96 is a sensor that detects rotation angular speed around a vertical axis of the vehicle 12. The road surface condition detection sensor 98 is a sensor that detects a wet state, a compacted snow state, and a frozen state etc. of a road surface.

The TRC 100 is a system that detects slipping of wheels and that controls a rotating force. The ABS 102 controls a braking force of the wheels to avoid a locked state of the wheels during braking. The VSC 104 controls a rotating force of the wheels based on a yaw rate and a steering angle to prevent the vehicle 12 from skidding etc. on a road with a low friction coefficient.

The occupant restraint system 90 for the vehicle uses hardware resources illustrated in FIG. 12 to realize various functions. The function configuration realized by the occupant restraint system 90 for the vehicle will be described with reference to FIG. 13.

Figure 13:
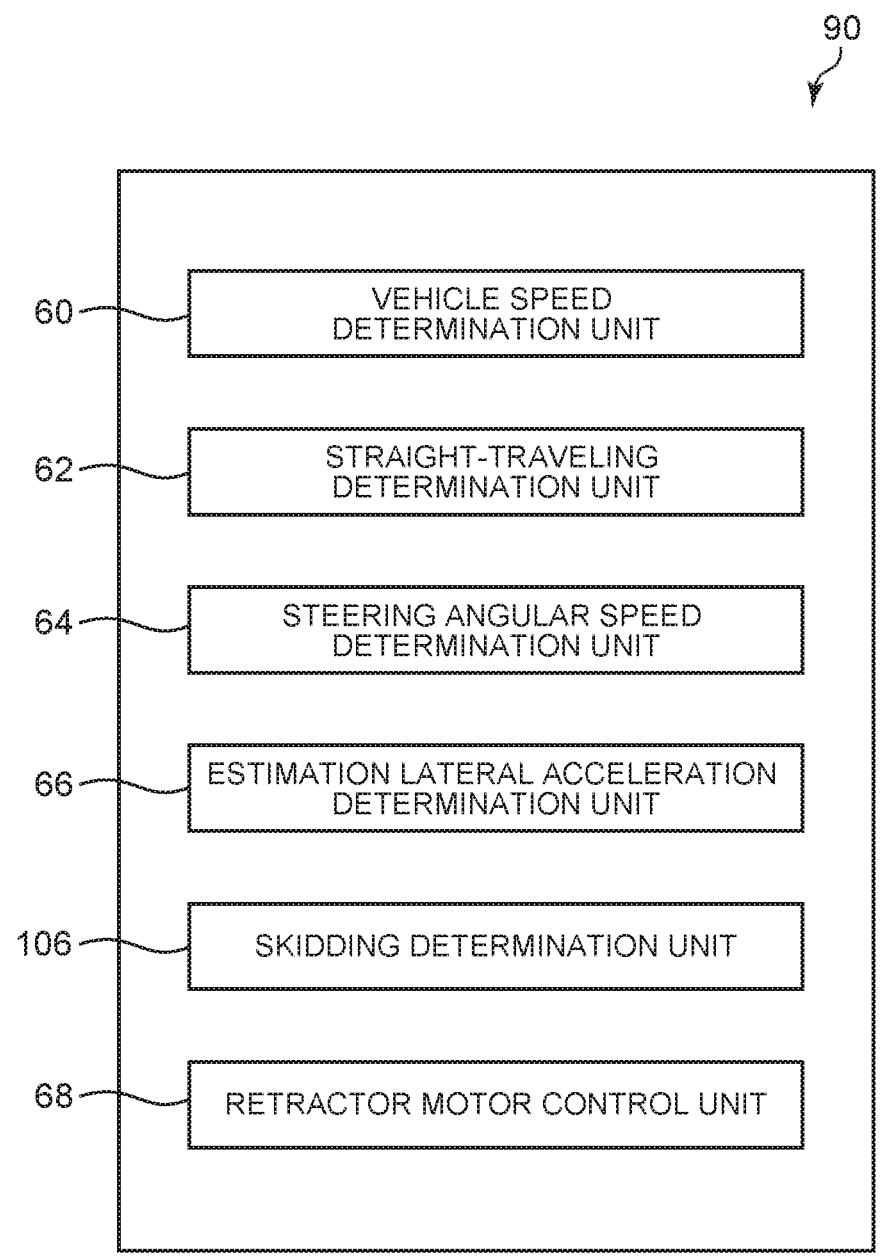
FIG. 13 is a block diagram of a function configuration of the occupant restraint system for the vehicle according to the fourth embodiment.

As illustrated in FIG. 13, the occupant restraint system 90 for the vehicle includes, as the function configuration, the vehicle speed determination unit 60, the straight-traveling determination unit 62, the steering angular speed determination unit 64, the estimation lateral acceleration determination unit 66, a skidding determination unit 106, and the retractor motor control unit 68. The CPU 50 of the ECU 40 reads and executes the programs for when skidding occurs, which is stored in the ROM 52 or the storage 56, so as to realize the function configurations.

The skidding determination unit 106 predicts skidding of the vehicle 12 beforehand or detects skidding of the vehicle 12 at an early stage with information acquired from the acceleration sensor 92, the brake pressure sensor 94, the yaw rate sensor 96, and the road surface condition detection sensor 98, and operation signals of the TRC 100, the ABS 102, and the VSC 104.

A flow of an occupant restraint process by the occupant restraint system 90 for the vehicle will be described below with reference to the flowchart in FIG. 14. For example, the occupant restraint process is performed by the CPU 50 reading the program from the ROM 52 or the storage 56, loading the program into the RAM 54, and executing the program.

Figure 14:
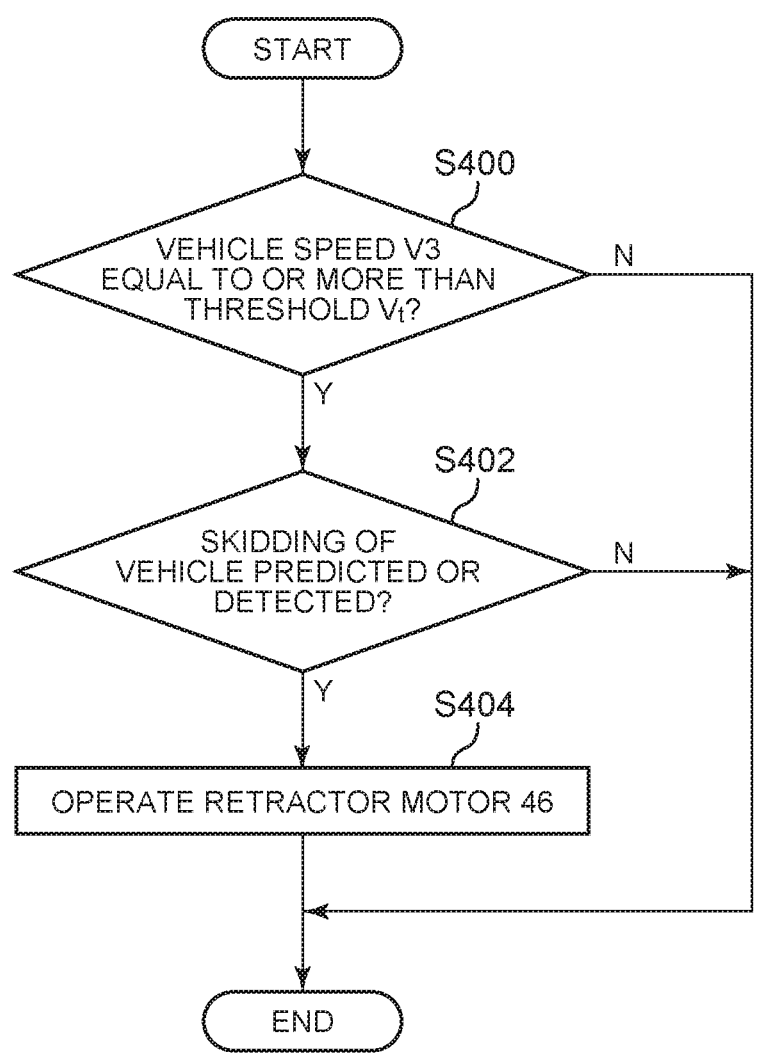
FIG. 14 is a flowchart illustrating the flow of the occupant restraint process according to the fourth embodiment.

As illustrated in FIG. 14, in step S400, the CPU 50 determines whether the vehicle speed V3 of the vehicle 12 detected by the vehicle speed sensor 44 is equal to or more than the vehicle speed threshold $V_t$. When the vehicle speed V3 is equal to or more than the vehicle speed threshold $V_t$, the CPU 50 then moves on to step S402. When the vehicle speed V3 is less than the vehicle speed threshold $V_t$, the CPU 50 ends the process.

In step S402, the CPU 50 determines whether skidding of the vehicle 12 is predicted beforehand or detected at an early stage. When skidding of the vehicle 12 is predicted beforehand or detected at an early stage, the CPU 50 moves on to step S404. When skidding of the vehicle 12 is not predicted beforehand or detected at an early stage, the CPU 50 ends the process.

In step S404, the CPU 50 causes the retractor motor 46 to operate. Here, with the function of the retractor motor control unit 68, the CPU 50 controls the retractor motor 46 so that the spool 30A is rotated in the winding direction for a prescribed amount. In the embodiment, the winding amount of the spool 30A in step S404 is set to be smaller than the winding amount when the estimated lateral acceleration a1 in the first embodiment is equal to or more than the threshold $a_t$ (see step S108 in FIG. 6).

The operation and effects of the fourth embodiment will be described.

Figure 15:
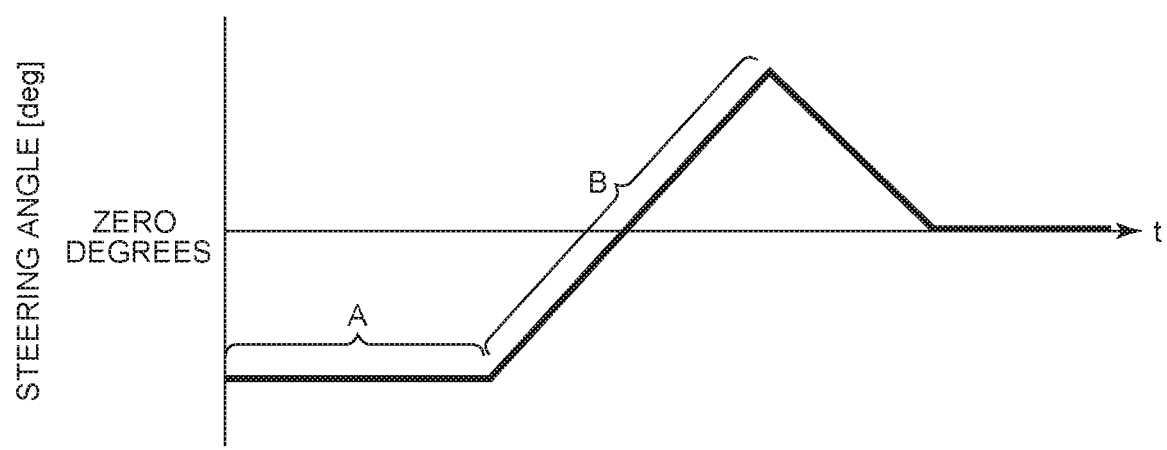
FIG. 15 is a graph of a relationship between time and a steering angle during the occupant restraint process according to the fourth embodiment.

The configuration described above is similar to that of the occupant restraint system 10 according to the first embodiment, except that the webbing 24 is wound when skidding of the vehicle 12 is predicted or detected. Thus, similar effects to that of the first embodiment can be acquired. A smaller amount of the webbing 24 is wound when skidding of the vehicle 12 is predicted or detected, compared to when the estimated lateral acceleration a1 is equal to or more than the acceleration threshold $a_t$. That is, the webbing 24 is wound to some extent before counter steering operation is performed by the occupant P when skidding of the vehicle 12 occurs. This means that when skidding of the vehicle 12 is predicted beforehand or detected at an early stage when there is no change in the steering angle (state A in the figure), the webbing 24 is wound to some extent, and when the occupant P performs counter steering operation so that an input of a sudden steering is received (state B in the figure), the webbing 24 is further wound, as illustrated in FIG. 15. In this way, an amount of change of tensile force of the webbing 24 between before counter steering operation (state A in the figure) and during counter steering operation (state B in the figure) can be reduced. It is thus possible to mitigate uncomfortableness that is felt by the occupant P. It is therefore possible to suppress the occupant P from feeling uncomfortable.

The first to fourth embodiments are described above. The disclosure may be implemented in various forms without departing from the scope and spirit of the disclosure. For example, in the above embodiments, the retractor 30 that is a winding device is provided on the vehicle body side as illustrated in FIG. 1. However, the disclosure is not limited to this. That is, a seat belt device attached to a seat, in which the retractor 30 and the belt guide are provided on the vehicular seat 14, may be adopted. In this case, the other end of the webbing 24 is fixed to the vehicular seat 14.

In the second embodiment, the winding amount of the webbing 24 in step S234 is controlled to be less than, the winding amount of the webbing 24 in step S210. However, the winding amount of the webbing 24 is not limited to this. For example, the winding amount of the webbing 24 in step S234 may be the same as the winding amount of the webbing 24 in step S210.

In the second embodiment, the acceleration threshold $a_v$ when an input of a sudden steering in the returning direction is received (step S232) is set to be a value larger than the acceleration threshold $a_u$ when an input of a sudden steering in the turning direction is received (step S222). However, the acceleration thresholds $a_v$, au are not limited to this. For example, the values of the acceleration threshold $a_v$ and the acceleration threshold $a_u$ may be almost the same.

The process in which the CPU 50 read and executed a software (program) in the above embodiments may be executed by various processors other than the CPU. In this case, examples of the processors include: a programmable logic device (PLD) in which a circuit configuration can be changed after the device is manufactured, such as a field-programmable gate array (FPGA); and a dedicated electric circuit that is a processor including a dedicated circuit configuration that is designed for executing a specific process, such as an application specific integrated circuit (ASIC). The above process may be executed by one of the various processors, or may be executed by combining two or more processors of the same type or of a different type (for example, a combination of a plurality of FPGAs or a combination of the CPU and the FPGA). Specifically, hardware structures of the various processors are electric circuits in which circuit elements are combined.

In the above embodiment, the storage 56 is a storing unit. However, the storing unit is not limited to this. For example, the storing unit may be a storing medium such as a compact disk (CD), a digital versatile disk (DVD), and a universal serial bus (USB).

What is claimed is:

1. An occupant restraint system for a vehicle, the occupant restraint system comprising:
    a seat belt device configured to restrain an occupant seated on a vehicular seat with a webbing, in which a first end of the webbing is wound around a winding device and a second end is fixed to one of the vehicular seat and a vehicle body, and the seat belt device configured such that a motor provided in the winding device is driven to wind the webbing; and
    an electronic control unit configured to:
        drive the motor such that a prescribed amount of the webbing is wound, when a first condition is satisfied, the first condition being that a vehicle speed is equal to or more than a prescribed vehicle speed threshold, a steering angular speed is equal to or more than a prescribed steering angular speed threshold, and an estimated lateral acceleration that is estimated to act on the vehicle is equal to or more than a prescribed first acceleration threshold; and
        reduce a winding amount of the webbing such that the winding amount of the webbing when the steering angular speed is equal to or more than the prescribed steering angular speed threshold due to steering being performed in one direction and then steering being performed in a reverse direction, is smaller than a winding amount of the webbing when the steering angular speed is equal to or more than the prescribed steering angular speed threshold due to steering being performed in one direction and then steering being performed in the same direction.

2. The occupant restraint system for the vehicle according to claim 1, the occupant restraint system further comprising:
    a steering angle sensor configured to detect a steering angle; and
    a vehicle speed sensor that detects the vehicle speed, wherein the steering angular speed is calculated based on the steering angle detected by the steering angle sensor and the estimated lateral acceleration is calculated based on the vehicle speed detected by the vehicle speed sensor and the steering angle.

3. The occupant restraint system for the vehicle according to claim 2, wherein:

the electronic control unit is configured to drive the motor such that the prescribed amount of the webbing is wound, when a second condition is satisfied; and the second condition is that an absolute value of the steering angle is larger than a steering angle at which the vehicle is determined to be traveling straight, and an amount of change of the steering angle is large, with reference to a state in which the vehicle speed is equal to or more than the prescribed vehicle speed threshold and the steering angular speed is equal to or more than the prescribed steering angular speed threshold.

4. The occupant restraint system for the vehicle according to claim 2, wherein:

the electronic control unit is configured to drive the motor such that a prescribed amount of the webbing is wound, when a third condition is satisfied; and the third condition is that an absolute value of the steering angle is larger than a steering angle at which the vehicle is determined to be traveling straight, and the estimated lateral acceleration is equal to or more than a prescribed second acceleration threshold, the estimated lateral acceleration being calculated based on the vehicle speed and an amount of change of the steering angle after a prescribed period of time has passed, with reference to a state in which the vehicle speed is equal to or more than the prescribed vehicle speed threshold and the steering angular speed is equal to or more than the prescribed steering angular speed threshold.

5. The occupant restraint system for the vehicle according to claim 1, wherein the electronic control unit is configured to set an acceleration threshold for driving the motor when steering is performed in one direction and then steering is performed in the reverse direction to be a value larger than the acceleration threshold when steering is performed in one direction and then steering is performed in the same direction.

6. The occupant restraint system for the vehicle according to claim 2, wherein:

the electronic control unit is configured to switch a determination element from an amount of change of the steering angle to an absolute value of the steering angle within a prescribed period of time, the prescribed period of time being from when the vehicle is determined to be traveling straight to when steering is performed in one direction and then steering is performed in a reverse direction; and the electronic control unit is configured to drive a motor to wind the webbing for a prescribed amount when the estimated lateral acceleration that is calculated based on the vehicle speed and the absolute value of the steering angle is equal to or more than a prescribed acceleration threshold.

7. The occupant restraint system for the vehicle according to claim 1, wherein the electronic control unit is configured to wind an amount of the webbing that is smaller than an amount of the webbing that is wound when the estimated lateral acceleration is equal to or more than a prescribed acceleration threshold, when skidding is predicted or detected while the vehicle is traveling.

* * * * *